US010843729B2

(12) United States Patent
Shimizu

(10) Patent No.: US 10,843,729 B2
(45) Date of Patent: Nov. 24, 2020

(54) DEVIATION AVOIDANCE APPARATUS

(71) Applicant: DENSO CORPORATION, Kariya (JP)

(72) Inventor: Takahiro Shimizu, Kariya (JP)

(73) Assignee: DENSO CORPORATION, Kariya (JP)

( * ) Notice: Subject to any disclaimer, the term of this patent is extended or adjusted under 35 U.S.C. 154(b) by 254 days.

(21) Appl. No.: 15/740,526

(22) PCT Filed: Jun. 24, 2016

(86) PCT No.: PCT/JP2016/068746
§ 371 (c)(1),
(2) Date: Dec. 28, 2017

(87) PCT Pub. No.: WO2017/002711
PCT Pub. Date: Jan. 5, 2017

(65) Prior Publication Data
US 2018/0170429 A1   Jun. 21, 2018

(30) Foreign Application Priority Data

Jun. 30, 2015 (JP) ................................. 2015-131314

(51) Int. Cl.
*B62D 15/02* (2006.01)
*B60W 30/12* (2020.01)
(Continued)

(52) U.S. Cl.
CPC .......... *B62D 15/025* (2013.01); *B60W 30/09* (2013.01); *B60W 30/12* (2013.01); *B62D 6/10* (2013.01);
(Continued)

(58) Field of Classification Search
CPC .... B62D 15/025; B62D 15/0265; B62D 6/10; G08G 1/167; G08G 1/166; B60W 30/09;
(Continued)

(56) References Cited

U.S. PATENT DOCUMENTS 6,405,132 B1 * 6/2002 Breed .................... B60R 22/26
                                                                 701/301
7,038,577 B2 * 5/2006 Pawlicki .............. G06K 9/4604
                                                                 340/435
(Continued)

FOREIGN PATENT DOCUMENTS

JP        2000-215396 A     8/2000
JP         2004-38858 A     2/2004
(Continued)

*Primary Examiner* — Jaime Figueroa
(74) *Attorney, Agent, or Firm* — Maschoff Brennan

(57) ABSTRACT

A deviation avoidance apparatus includes: a boundary detection section that detects boundaries defining both edges in a width direction of a traveling path on which an own vehicle travels; a deviation prediction section that predicts that the own vehicle will deviate from the traveling path based on a travelling condition of the own vehicle that travels on the traveling path defined by the boundaries detected by the boundary detection section; an object detection section that detects an object that exists on one of the boundaries, the one of the boundaries being on a side where the own vehicle deviates from the traveling path, or outside of the one of the boundaries; a deviation avoidance section that commands, when the deviation prediction section predicts that the own vehicle will deviate from the traveling path, a travel control unit to have the own vehicle avoid deviating from the traveling path, the travel control unit controlling the travelling condition; and a command value adjustment section that adjusts, when the object detection section detects the object, a command value to be output from the deviation avoidance section to the travel control unit such that a maximum movement position in a case where the own vehicle moves to the side where the own vehicle deviates from the traveling path is on an inside of the traveling path with respect to the one of the boundaries on the side where the own vehicle deviates from the traveling path.

18 Claims, 13 Drawing Sheets

(51) Int. Cl.
*B60W 30/09* (2012.01)
*G08G 1/16* (2006.01)
*G06K 9/00* (2006.01)
*B62D 6/10* (2006.01)
*G01S 13/86* (2006.01)
*G01S 13/931* (2020.01)
*H04N 7/18* (2006.01)

(52) U.S. Cl.
CPC ..... *B62D 15/0265* (2013.01); *G06K 9/00798* (2013.01); *G06K 9/00805* (2013.01); *G08G 1/166* (2013.01); *G08G 1/167* (2013.01); *B60W 2554/00* (2020.02); *G01S 13/867* (2013.01); *G01S 13/931* (2013.01); *G01S 2013/9318* (2020.01); *H04N 7/185* (2013.01)

(58) Field of Classification Search
CPC .............. B60W 30/12; B60W 2550/10; G06K 9/00805; G06K 9/00798; G01S 2013/9318; G01S 13/867; G01S 13/931; H04N 7/185
USPC ....................................................... 701/1, 41
See application file for complete search history.

(56) References Cited

U.S. PATENT DOCUMENTS

| | | | | |
|---|---|---|---|---|
| 8,090,537 | B2* | 1/2012 | Nishira | G05D 1/0214 340/436 |
| 8,706,394 | B2* | 4/2014 | Trepagnier | G05D 1/024 701/301 |
| 8,924,078 | B2* | 12/2014 | Jeromin | B60Q 1/143 340/901 |
| 9,229,453 | B1* | 1/2016 | Lee | G05D 1/0214 |
| 9,597,960 | B2* | 3/2017 | Okuda | B60W 50/14 |
| 2005/0096827 | A1* | 5/2005 | Sadano | B60T 7/22 701/70 |
| 2005/0125125 | A1* | 6/2005 | Matsumoto | G08G 1/167 701/41 |
| 2005/0177308 | A1* | 8/2005 | Tange | B60T 8/17557 701/301 |
| 2007/0225914 | A1* | 9/2007 | Kawazoe | B60W 30/12 701/301 |
| 2007/0288133 | A1* | 12/2007 | Nishira | G05D 1/0214 701/23 |
| 2008/0300788 | A1* | 12/2008 | Kanaboshi | B62D 15/0265 701/301 |
| 2010/0324823 | A1 | 12/2010 | Kobayashi et al. | |
| 2012/0140039 | A1 | 6/2012 | Ota et al. | |
| 2013/0190985 | A1* | 7/2013 | Nakano | B62D 6/00 701/41 |
| 2013/0321627 | A1* | 12/2013 | Turn, Jr. | B60W 30/00 348/148 |
| 2014/0009615 | A1* | 1/2014 | Kiyohara | H04N 7/18 348/148 |
| 2014/0350785 | A1 | 11/2014 | Tsuchida | |
| 2015/0063648 | A1* | 3/2015 | Minemura | G06K 9/6217 382/104 |
| 2015/0367781 | A1* | 12/2015 | Takemae | B60R 1/00 348/148 |
| 2016/0046290 | A1* | 2/2016 | Aharony | G06K 9/00798 701/41 |
| 2016/0152237 | A1* | 6/2016 | Takahashi | G08G 1/167 701/41 |
| 2016/0176400 | A1* | 6/2016 | Nakano | B62D 15/025 701/41 |
| 2017/0236422 | A1* | 8/2017 | Naka | G05D 1/0274 701/301 |

FOREIGN PATENT DOCUMENTS

| | | |
|---|---|---|
| JP | 2005-056025 | 3/2005 |
| JP | 2009-226981 A | 10/2009 |
| JP | 2011-121501 A | 6/2011 |
| JP | 2012-123495 A | 6/2012 |
| JP | 2013-242670 | 12/2013 |
| JP | 5407952 B2 | 2/2014 |
| JP | 2015-115040 A | 6/2015 |

* cited by examiner

DEVIATION AVOIDANCE APPARATUS

TECHNICAL FIELD

The present invention relates to a technique for avoiding deviation of an own vehicle from a traveling path.

BACKGROUND ART

Techniques are known for controlling, in a case where the own vehicle traveling on the travelling path is predicted to deviate therefrom, a travelling condition of the own vehicle such that the own vehicle avoids deviating from the travelling path (refer, for example, to Patent Literature 1).

According to the technique disclosed in Patent Literature 1, in a case where the own vehicle traveling in a lane changes travel lane, specifically, deviates into an adjacent lane in which an obstacle exists, an obstacle avoidance process for having the own vehicle travel in a direction which is not toward the obstacle is started at a timing earlier in a case where the lane change is intentionally performed than in a case where the lane change is unintentionally performed.

CITATION LIST

Patent Literature

[Patent Literature 1] Japanese Patent No. 5407952

SUMMARY OF THE INVENTION

Technical Problem

In the technique disclosed in Patent Literature 1, in a case where the obstacle avoidance process is performed, it is unclear to which position on the adjacent lane side the own vehicle moves irrespective of whether or not the lane change to the adjacent lane in which the obstacle exists is intentionally performed. When the own vehicle can avoid approaching the obstacle, the own vehicle may enter the adjacent lane in which the obstacle exists.

In a case where an object that exists on a boundary or outside the boundary is, for example, a pedestrian walking on a road shoulder, the boundary defining one of both edges in the width direction of the travelling path on which the own vehicle travels, when the own vehicle is allowed to deviate to the outside of the boundary, the pedestrian walking on the boundary or on the outside of the boundary may have a fear. In addition, when the own vehicle is allowed to deviate to the outside of the boundary, the own vehicle may come into contact with the object.

Solution to Problem

An embodiment provides a technique for avoiding deviation of an own vehicle from a traveling path.

A deviation avoidance apparatus of an embodiment includes: a boundary detection section that detects boundaries defining both edges in a width direction of a traveling path on which an own vehicle travels; a deviation prediction section that predicts that the own vehicle will deviate from the traveling path based on a travelling condition of the own vehicle that travels on the traveling path defined by the boundaries detected by the boundary detection section; an object detection section that detects an object that exists on one of the boundaries, the one of the boundaries being on a side where the own vehicle deviates from the traveling path, or outside of the one of the boundaries; a deviation avoidance section that commands, when the deviation prediction section predicts that the own vehicle will deviate from the traveling path, a travel control unit to have the own vehicle avoid deviating from the traveling path, the travel control unit controlling the travelling condition; and a command value adjustment section that adjusts, when the object detection section detects the object, a command value to be output from the deviation avoidance section to the travel control unit such that a maximum movement position in a case where the own vehicle moves to the side where the own vehicle deviates from the traveling path is on an inside of the traveling path with respect to the one of the boundaries on the side where the own vehicle deviates from the traveling path.

DESCRIPTION OF EMBODIMENTS

Hereinafter, embodiments of the present invention are described with reference to the drawings.

1. First Embodiment

[1-1. Configuration]

Figure 1:
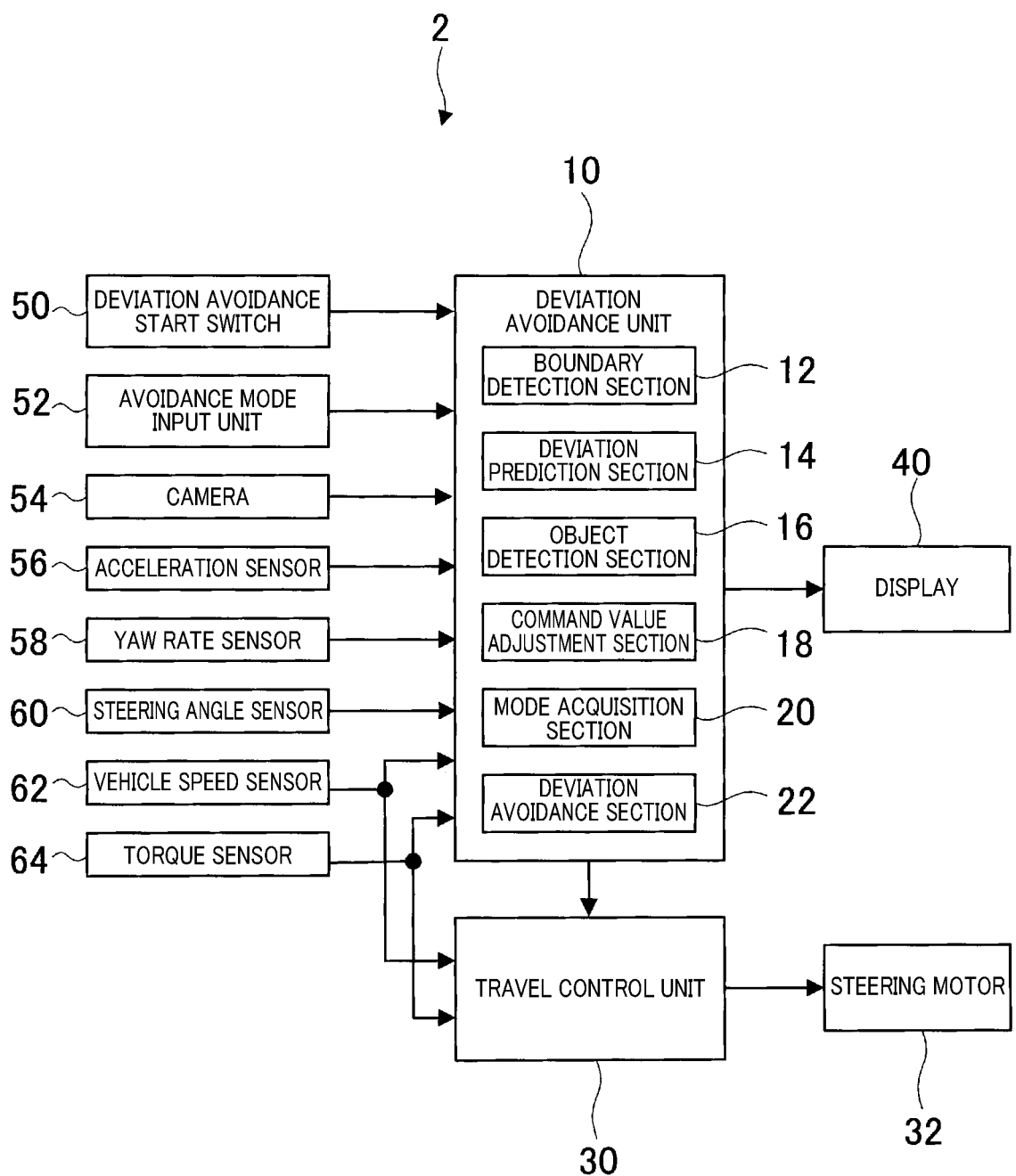
FIG. 1 is a block diagram showing a deviation avoidance apparatus according to a first embodiment.

A deviation avoidance system 2 shown in FIG. 1 includes a deviation avoidance unit 10, a travel control unit 30, a steering motor 32, a display 40, a deviation avoidance start switch 50, an avoidance mode input unit 52, a camera 54, an acceleration sensor 56, a yaw rate sensor 58, a steering angle sensor 60, a vehicle speed sensor 62, and a torque sensor 64. The system is installed in a vehicle.

The deviation avoidance unit 10 is a computer including a CPU, a RAM, and a ROM. The deviation avoidance unit 10 performs, in accordance with a program stored in the ROM, a deviation avoidance process described later. In the following, the vehicle having the deviation avoidance unit 10 installed therein is referred to as an own vehicle.

The deviation avoidance unit 10 functionally includes a boundary detection section 12, a deviation prediction section 14, an object detection section 16, a command value adjustment section 18, a mode acquisition section 20, and a deviation avoidance section 22. Functions of these sections of the deviation avoidance unit 10 are described below.

The travel control unit 30 acquires, from the torque sensor 64, steering torque produced by the operation of a steering wheel (hereinafter, also simply referred to as "wheel") by the driver, and acquires a vehicle speed of an own vehicle 100 from the vehicle speed sensor 62. Furthermore, the travel control unit 30 calculates, based on the steering torque and the vehicle speed, assist torque from the steering motor 32 that assists the steering operation by the driver. In addition, the travel control unit 30 controls the steering motor 32 with the amount of electricity applied in accordance with result of the calculation. Thereby, the amount of assistance for the force exerted by the driver to turn the wheel is controlled.

Further, in a case of having the own vehicle avoid deviating from the travelling path in which the own vehicle is traveling, the travel control unit 30 controls the amount of electricity applied to the steering motor 32 in response to a command issued from the deviation avoidance unit 10. Thereby, the travelling condition of the own vehicle is controlled. The steering motor 32 corresponds to a steering actuator that drives a steering mechanism that changes the travelling direction of the own vehicle.

The travel control unit 30 controls not only the application of electricity to the steering motor 32 but also, for example, a brake system, a powertrain system, and the like (none of which is shown). Thereby, the travelling condition of the own vehicle is controlled. The travelling condition of the own vehicle includes vehicle speeds in the longitudinal direction and the lateral direction of the own vehicle, a lateral position of the own vehicle in the travelling path, and accelerations in the longitudinal direction and the lateral direction of the own vehicle.

Figure 2:
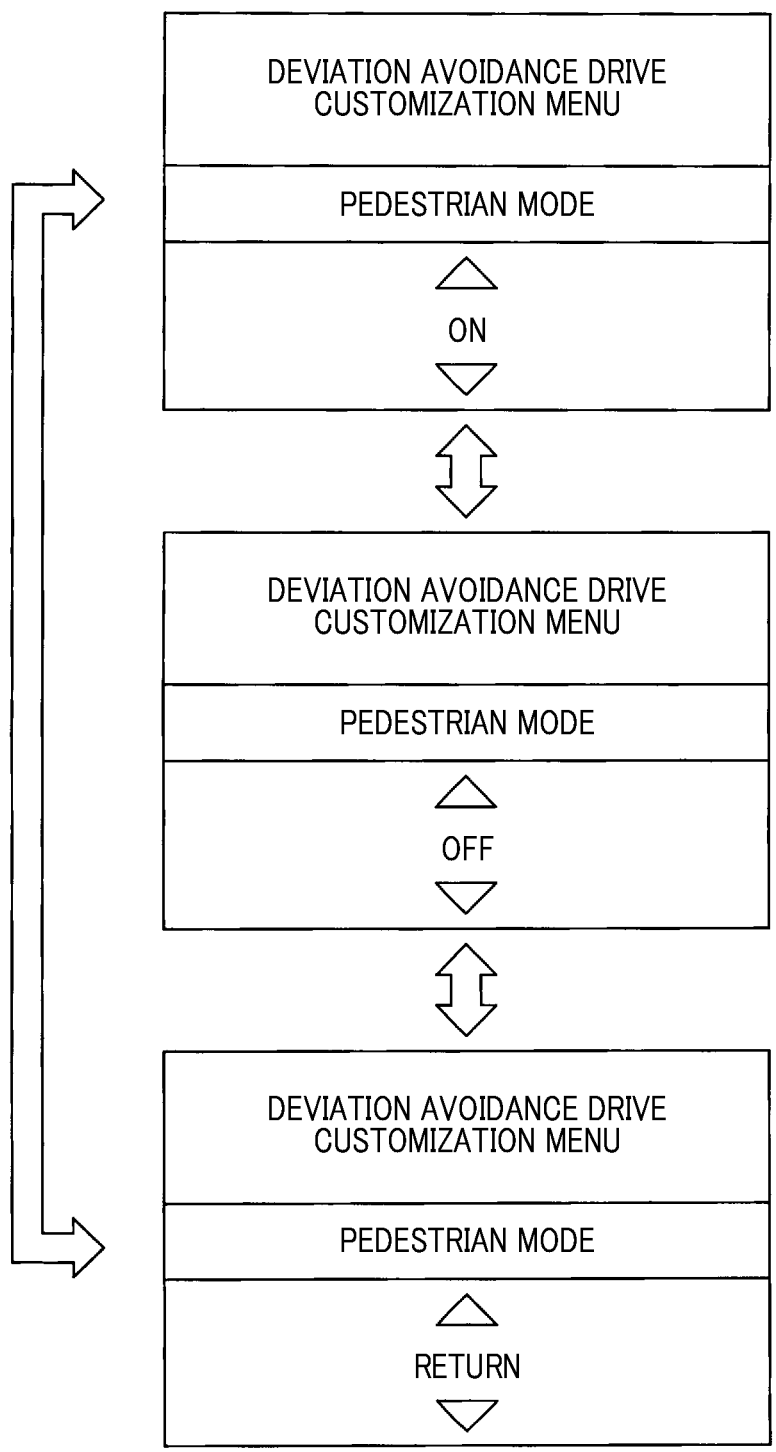
FIG. 2 is an explanatory diagram illustrating a procedure for setting a pedestrian mode.

The deviation avoidance start switch 50 is installed, for example, in a front panel. When the deviation avoidance start switch 50 is turned on, the deviation avoidance process to be performed by the deviation avoidance unit 10 is started, and an upper menu shown in FIG. 2 is displayed on the display 40. As the display 40, there may be used a display of a navigation unit (not shown), or a display dedicated to the deviation avoidance process.

Figure 3:
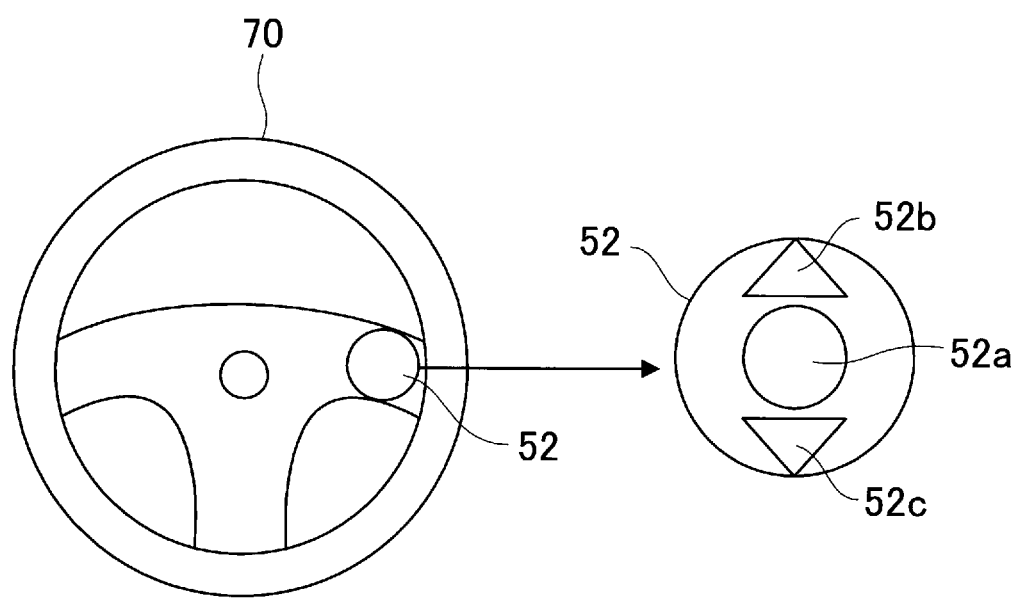
FIG. 3 is a schematic view illustrating an avoidance mode input unit.

As illustrated in FIG. 3, the avoidance mode input unit 52 is installed, for example, in a wheel 70. The wheel 70 is a part of the steering mechanism that changes the traveling direction of the own vehicle. The avoidance mode input unit 52 includes a determination portion 52*a*, and selection portions 52*b* and 52*c*. When the avoidance mode input unit 52 is operated, any of the upper menu, a middle menu, and a lower menu shown in FIG. 2 is displayed. Then, an avoidance mode for determining how predicted deviation of the own vehicle from the travelling path is avoided is selected.

When the selection portion 52*b* or 52*c* of the avoidance mode input unit 52 is pressed, the menus shown in FIG. 2 are switched to each other. When the determination portion 52*a* is pressed under the state in which the upper menu of FIG. 2 is displayed, a pedestrian mode is determined to be the avoidance mode, and an image before the menus of FIG. 2 are displayed on the display 40 is displayed again.

When the determination portion 52*a* is pressed under the state in which the middle menu of FIG. 2 is displayed, a normal mode other than the pedestrian mode is determined to be the avoidance mode, and the image before the menus of FIG. 2 are displayed on the display 40 is displayed again.

When the determination portion 52*a* is pressed under the state in which the lower menu of FIG. 2 is displayed, the image before the menus of FIG. 2 are displayed on the display 40 is displayed again under the state in which the pedestrian mode or the normal mode has been determined to be the avoidance mode. Note that, when the determination portion 52*a* is pressed in the lower menu of FIG. 2 under a state in which the determination portion 52*a* has not been pressed in either of the upper menu and the middle menu of FIG. 2, the normal mode is selected as the avoidance mode.

The camera 54 is configured to capture images ahead of the own vehicle 100. The deviation avoidance unit 10 analyzes data of images acquired by the camera 54. The acceleration sensor 56 detects the accelerations in the longitudinal direction and the lateral direction of the own vehicle 100. The yaw rate sensor 58 detects a turn angular velocity of the own vehicle 100.

The steering angle sensor 60 detects a steering angle of the wheel 70. The vehicle speed sensor 62 detects a current vehicle speed of the own vehicle 100. The torque sensor 64 detects the torque at the time when the driver operates the wheel 70.

[1-2. Process]

Figure 4:
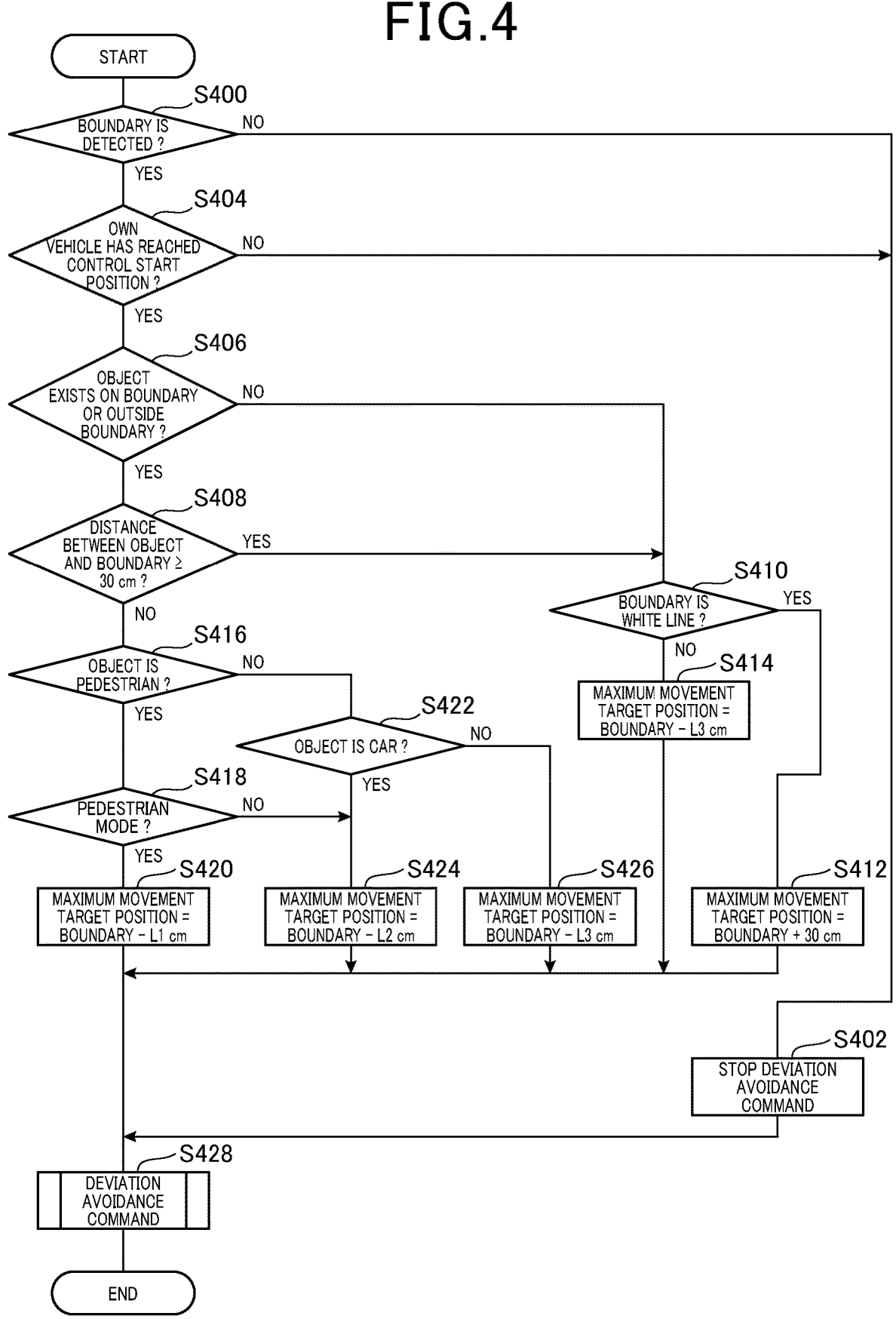
FIG. 4 is a flowchart of a deviation avoidance process according to the first embodiment.

The deviation avoidance process performed by the deviation avoidance unit 10 will be described. When the deviation avoidance start switch 50 is turned on, the deviation avoidance process shown in the flowchart of FIG. 4 is performed at predetermined time intervals.

Figure 5:
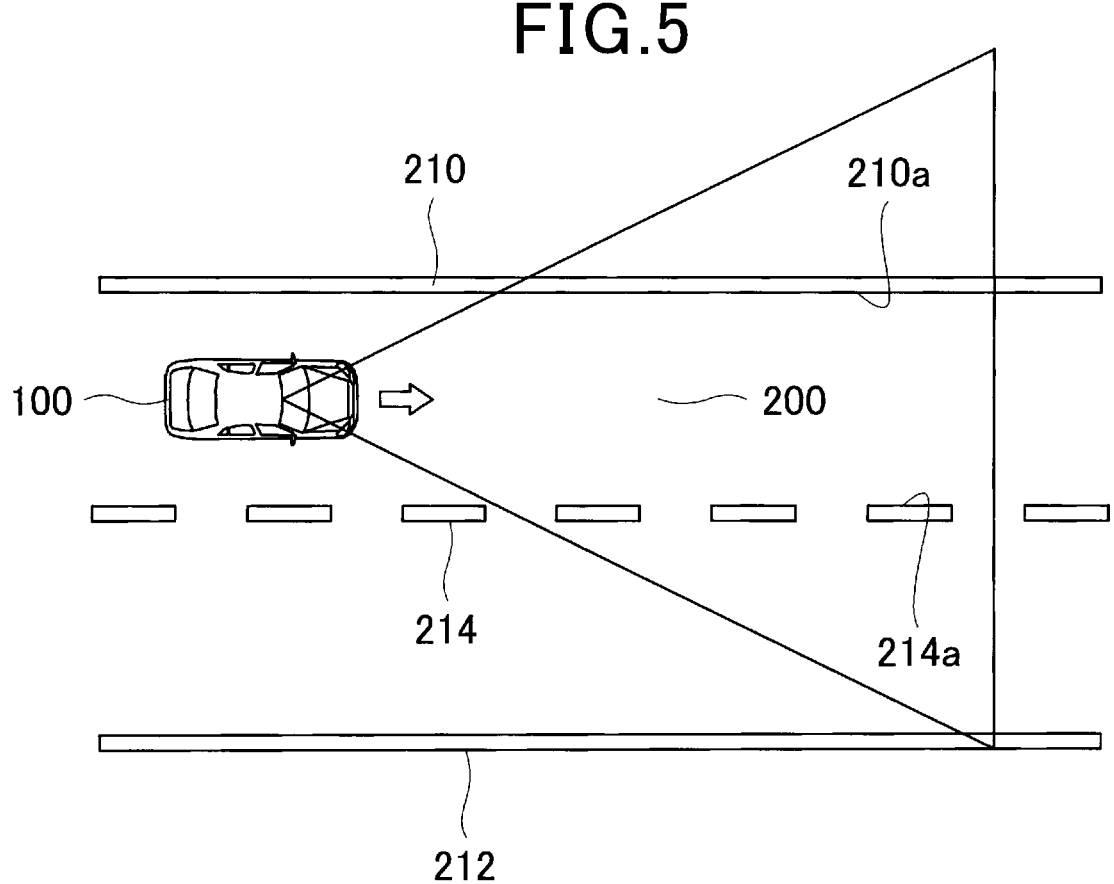
FIG. 5 is a schematic view illustrating an imaging range of a camera.
Figure 6:
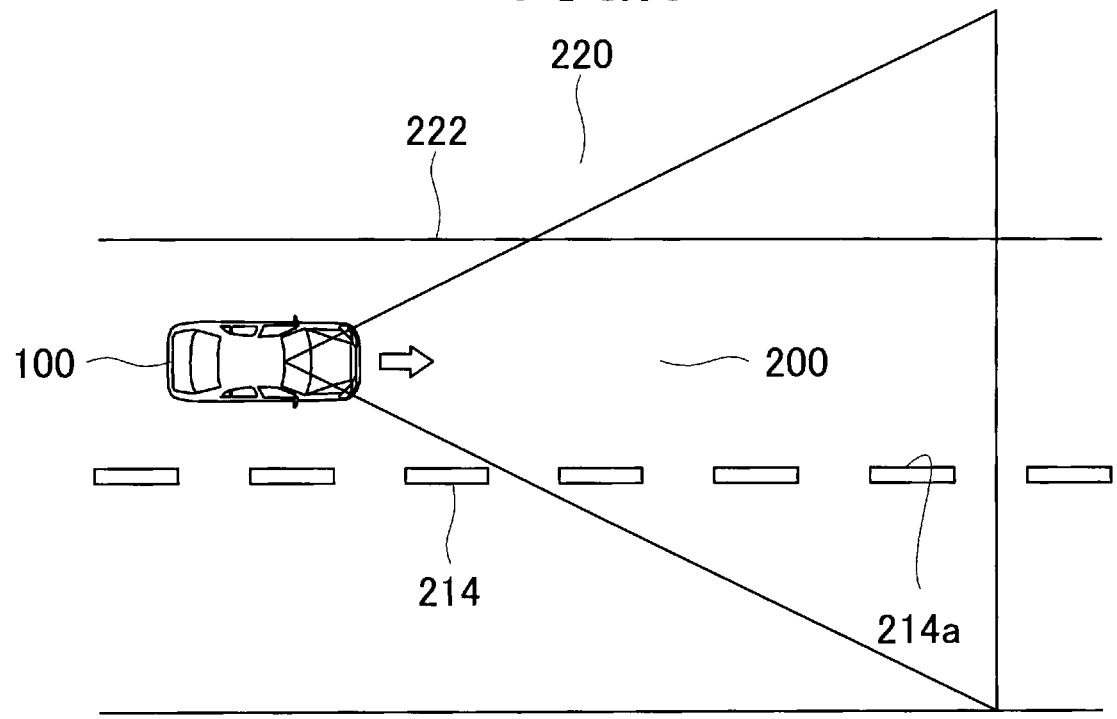
FIG. 6 is a schematic view illustrating another imaging range of the camera.

In S400, as illustrated in FIG. 5 and FIG. 6, the boundary detection section 12 analyzes the data of the images acquired by the camera 54, and determines whether or not boundaries of a travelling path 200 in which the own vehicle 100 travels can be detected. The boundaries of the travelling path 200 define both edges in the width direction of the travelling path 200.

In FIG. 5, out of left and right white lines 210 and 212 of a road, and a center line 214 of the road, an inner edge 210*a* of the left white line 210 and an inner edge 214*a* of the center line 214 are defined as the boundaries defining both the edges in the width direction of the traveling path 200. The white lines 210 and 212 and the center line 214 of the road are recognized, for example, by analyzing the image data. The boundaries are not limited to the inner edges 210*a* and 214*a*, and may be preset arbitrary positions on the white line 210 and the center line 214, such as outer edges of the white line 210 and the center line 214.

In FIG. 6, the white line does not exist on an edge portion side on one of both sides in the width direction of the travelling path 200, that is, on the left with respect to the own vehicle 100. The boundary, which is between a paved surface that is suited to travel and a part 220 that is unsuited to travel, is detected as a suitability boundary 222 of the travelling path 200, the suitability boundary 222 being defined based on suitability for the travel. Note that, the inner edge 210a of the white line 210 and the suitability boundary 222 may be collectively and simply referred to as a boundary.

As another example of the travelling path on which the white line does not exist, in a case where the center line 214 of FIG. 6 does not exist, the boundaries between the paved surface and the parts that are unsuited to travel are detected as the suitability boundaries at both the sides in the width direction of the travelling path.

Further, when the own vehicle 100 travels on the right in FIG. 6, on the right side that is one edge portion side of both the sides in the width direction of the travelling path on which the own vehicle 100 travels, the boundary between the paved surface and the part that is unsuited to travel is detected as the suitability boundary.

The suitability boundary 222 between the paved surface and the part 220 that is unsuited to travel is recognized, for example, by analyzing the image data. The boundary on the right of both the edges in the width direction of the traveling path 200 with respect to the own vehicle 100, is defined by the inner edge 214a of the center line 214.

In this way, in the case where the white line does not exist on at least one of the edge portion sides of both the edges in the width direction of the traveling path 200, the boundary between the part that is suited to travel of the own vehicle 100 and the part 220 on the edge portion side, which is unsuited to travel, is defined as the suitability boundary 222 of the traveling path 200 defined based on suitability to the travel.

The part that is suited to travel of the own vehicle 100 refers to the paved surface or a road surface that is not paved but is graded to an extent that the own vehicle 100 can travel thereon. The part 220 that is unsuited to travel of the own vehicle 100 refers to parts where the own vehicle 100 is structurally incapable of travel, such as a wall, a building, a guardrail, poles defining lanes, a gutter, a step, a cliff, and sand, or has difficulty in travel.

In S400, the boundary detection section 12 not only detects the boundaries of the traveling path 200, but also detects the width of the traveling path 200. In addition, the boundary detection section 12 detects coordinates of the boundaries of the traveling path 200 within a range of the images to be captured by the camera 54. Then, the boundary detection section 12 calculates a curvature of the traveling path 200 based on the coordinates of the boundaries. The boundary detection section 12 may acquire the curvature of the traveling path 200 based on map information of the navigation unit (not shown).

Further, based on the image data, the boundary detection section 12 also detects, as a reference point on the traveling path 200, for example, the lateral position of the own vehicle 100 with respect to the boundaries or the center line of the traveling path 200.

In a case where the boundary detection section 12 cannot detect the boundaries of the traveling path 200 (S400: No), the deviation avoidance section 22 commands the travel control unit 30 to stop deviation avoidance control for having the own vehicle 100 avoid deviating to the outside of the traveling path 200 (S402). Then, the present process is ended. Commanding the travel control unit 30 to stop the deviation avoidance control also includes continuation of current travel control in a case where the travel control unit 30 is not performing the deviation avoidance control.

For example, in a case where the boundary between the paved surface and the unpaved surface cannot be detected on the traveling path where the white lines are broken or the white lines do not exist, the boundary detection section 12 determines that the boundary of the traveling path cannot be detected.

In a case where the boundaries of the traveling path 200 can be detected (S400: Yes), the deviation prediction section 14 determines, based on whether or not the own vehicle 100 has reached a control start position at which the deviation avoidance section 22 has the travel control unit 30 to start the deviation avoidance control, whether or not the own vehicle 100 will deviate (S404). In accordance with the control start position, the timing at which the travel control unit 30 starts the deviation avoidance control is set.

The control start position is determined from the map, for example, as a distance from the boundary on the deviation side toward the inside of the traveling path 200 by using parameters such as a lateral velocity of the own vehicle 100, the curvature of the traveling path 200, and the width of the traveling path 200.

Figure 7:
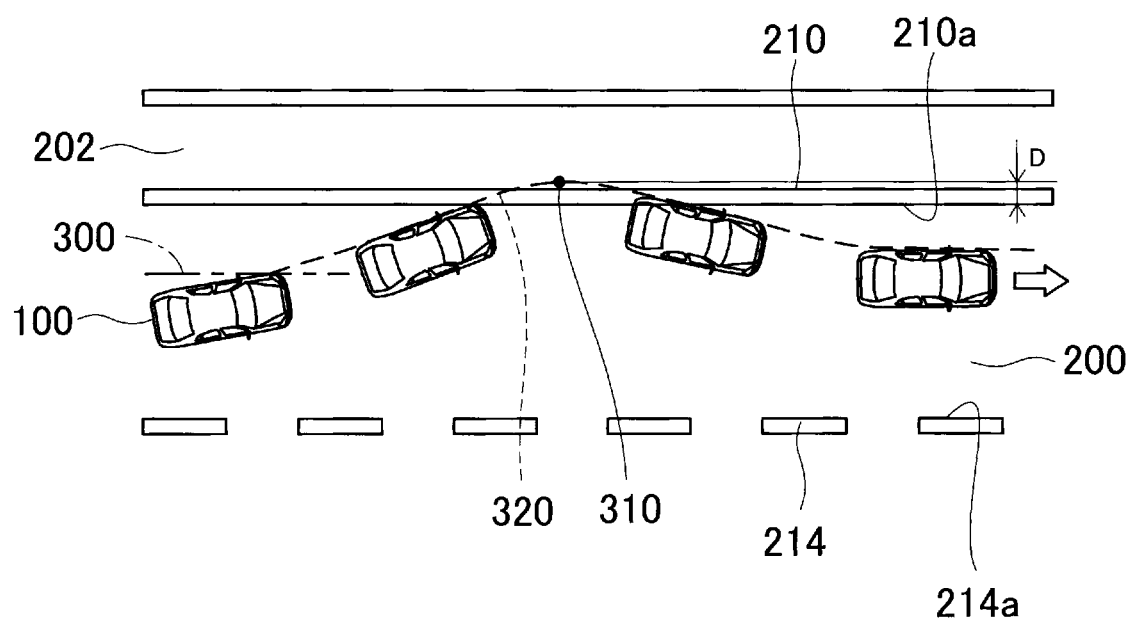
FIG. 7 is a schematic view illustrating deviation avoidance travel in a case where an object does not exist outside of a travelling path.

For example, in FIG. 7, the reference numeral 300 represents the control start position. When the outer rim of a front wheel on the deviation side of the own vehicle 100 reaches the control start position 300, the deviation prediction section 14 predicts that the own vehicle 100 will reach the control start position 300 and deviate from the traveling path 200. The control start position 300 refers, for example, to a position from which the own vehicle 100 reaches the boundary of the traveling path in a preset arrival period when moving at a current lateral velocity.

In a case where the own vehicle 100 has not yet reached the control start position 300 (S404: No), the deviation avoidance section 22 has the travel control unit 30 stop the deviation avoidance control (S402). Then, the present process is ended.

When the own vehicle 100 reaches the control start position 300 (S404: Yes), the deviation prediction section 14 predicts that the own vehicle 100 will deviate to the outside of the traveling path 200. In this case, the object detection section 16 analyzes the image data captured by the camera 54, and determines whether or not an object exists on the boundary on the deviation side or outside the boundary (S406).

When the object detection section 16 detects the object on the boundary on the deviation side or outside the boundary (S406: Yes), the object detection section 16 determines the type of the object by, for example, pattern matching using pre-stored dictionaries of object models. In addition, the object detection section 16 analyzes the image date, and detects the distance between the object and the boundary of the traveling path, that is, how far the object is away from the boundary to the outside.

Further, based on the position of the lower end of the object in the images captured by the camera 54, the object detection section 16 detects the distance between the own vehicle 100 and the object. It can be determined that, as the position of the lower end of the object becomes higher in the captured images, the distance between the own vehicle 100 and the object is longer.

In a case where the object does not exist on the boundary on the deviation side or outside the boundary (S406: No), the object detection section 16 advances the process to S410.

In a case where the object exists on the boundary on the deviation side or outside of the boundary (S406: Yes), the object detection section 16 determines whether or not the distance between the object and the boundary is equal to or longer than an allowable distance by which the own vehicle 100 is allowed to deviate to the outside of the boundary in the case where the object does not exist on the boundary or outside the boundary (S408). In the present embodiment, the allowable distance is set to 30 cm.

In a case where the distance between the object and the boundary is 30 cm or more (S408: Yes), the object detection section 16 advances the process to S410.

In S410, the command value adjustment section 18 determines whether or not the detected boundary on the deviation side of the traveling path 200 is a white line. The white line to be determined in S410 includes the center line.

In a case where the boundary is a white line (S410: Yes), the command value adjustment section 18 sets, as a command value to be output to the travel control unit 30 so as to avoid the deviation of the own vehicle 100, as illustrated in FIG. 7, a target position 310 for a maximum movement position to which the own vehicle 100 moves farthest to the deviation side in a range of from the boundary on the deviation side to the outside of the traveling path 200, the target position 310 being at a distance D of +30 cm from the inner edge 210a of the white line 210 on the deviation side (S412). Then, the command value adjustment section 18 advances the process to S428.

The plus sign of +30 cm indicates the outside of the traveling path 200 with respect to the inner edge 210a of the white line 210 on the deviation side.

Figure 8:
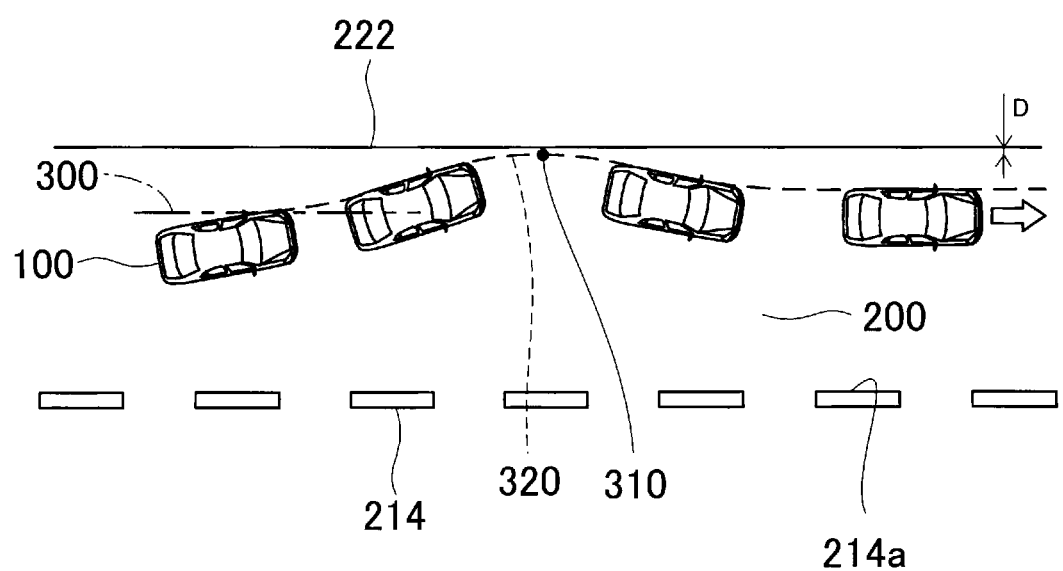
FIG. 8 is a schematic view illustrating another deviation avoidance travel in the case where an object does not exist outside the travelling path.

In a case where the boundary is other than a white line (S410: No), the command value adjustment section 18 sets, as the command value to be output to the travel control unit 30 so as to avoid the deviation of the own vehicle 100, as illustrated in FIG. 8, the target position 310 for the maximum movement position being at a distance D of (boundary—L3 cm) with respect to the suitability boundary 222 on the deviation side (S414). Then, the command value adjustment section 18 advances the process to S428.

L3 is a positive value, and hence the set target position 310 is located inside the traveling path 200 with respect to the suitability boundary 222 on the deviation side. L3 cm is set, for example, to 5 cm.

In a case where the distance between the object and the boundary is less than 30 cm (S408: No), the object detection section 16 determines whether or not the object is a pedestrian (S416). In a case where the object is not a pedestrian (S416: No), the object detection section 16 advances the process to S422.

Figure 9:
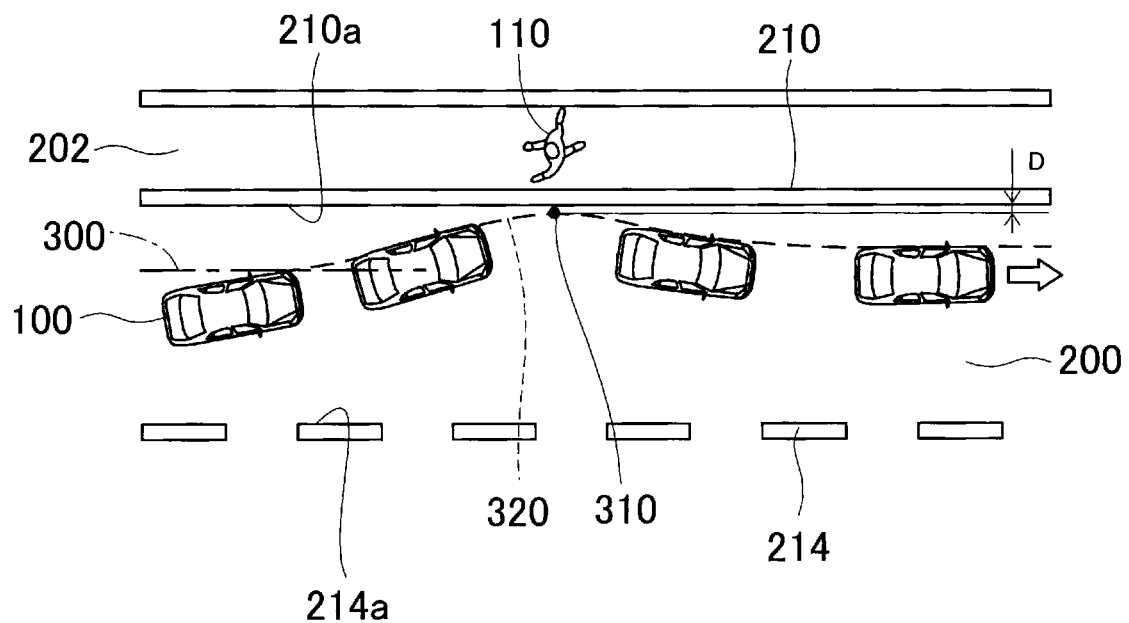
FIG. 9 is a schematic view illustrating deviation avoidance travel in a case where a pedestrian exists outside the traveling path.

When the object is a pedestrian 110 as illustrated in FIG. 9 (S416: Yes), the mode acquisition section 20 determines whether or not the pedestrian mode has been set as the avoidance mode via the avoidance mode input unit 52 (S418).

In a case where the pedestrian mode has been set as the avoidance mode (S418: Yes), the command value adjustment section 18 sets, as the command value to be output to the travel control unit 30 so as to avoid the deviation of the own vehicle 100, the target position 310 for the maximum movement position at a distance D of (boundary—L1 cm) with respect to the boundary, that is, to the inner edge 210a of the white line 210 on the deviation side (S420). Then, the command value adjustment section 18 advances the process to S428. L1 is a positive value, and the relationship L1>L3 is established. L1 cm is set, for example, to 15 cm.

In S422, the object detection section 16 determines whether or not the object is a parked vehicle.

Figure 10:
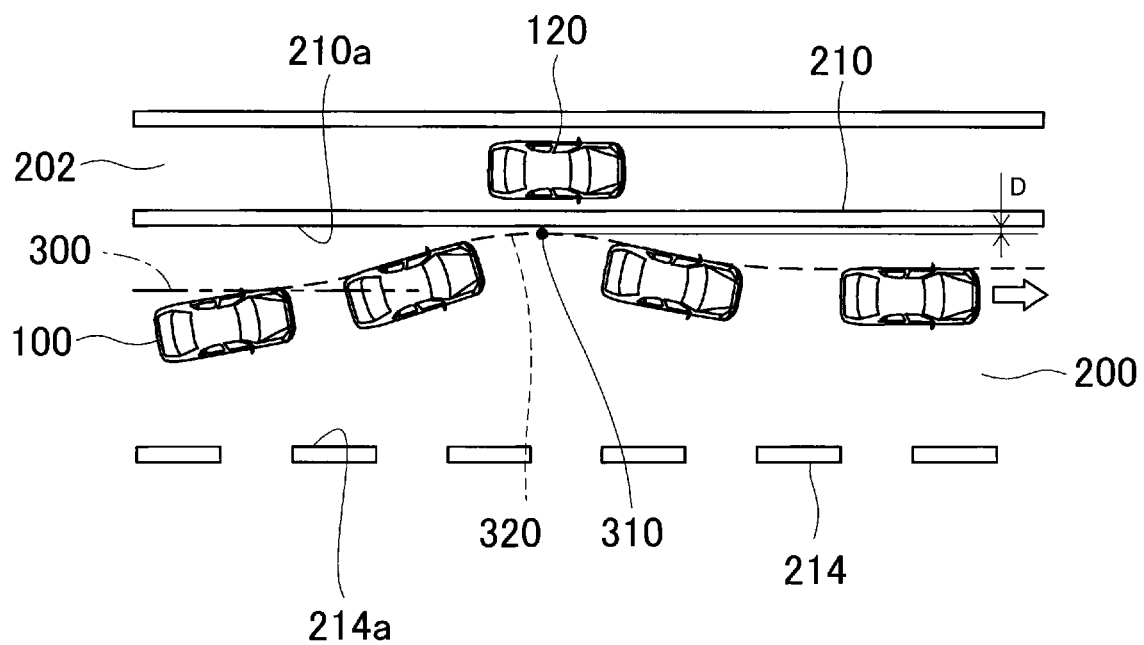
FIG. 10 is a schematic view illustrating deviation avoidance travel in a case where a parked vehicle exists on a road shoulder.

In a case where the object is a vehicle 120 parked on a road shoulder 202 as illustrated in FIG. 10 (S422: Yes), the command value adjustment section 18 sets, as the command value to be output to the travel control unit 30 so as to avoid the deviation of the own vehicle 100, the target position 310 for the maximum movement position at a distance D of (boundary—L2 cm) with respect to the boundary, that is, to the inner edge 210a of the white line 210 on the deviation side (S424). Then, the command value adjustment section 18 advances the process to S428. L2 is a positive value, and the relationship L1>L2>L3 is established. L2 cm is set, for example, to 10 cm.

Figure 11:
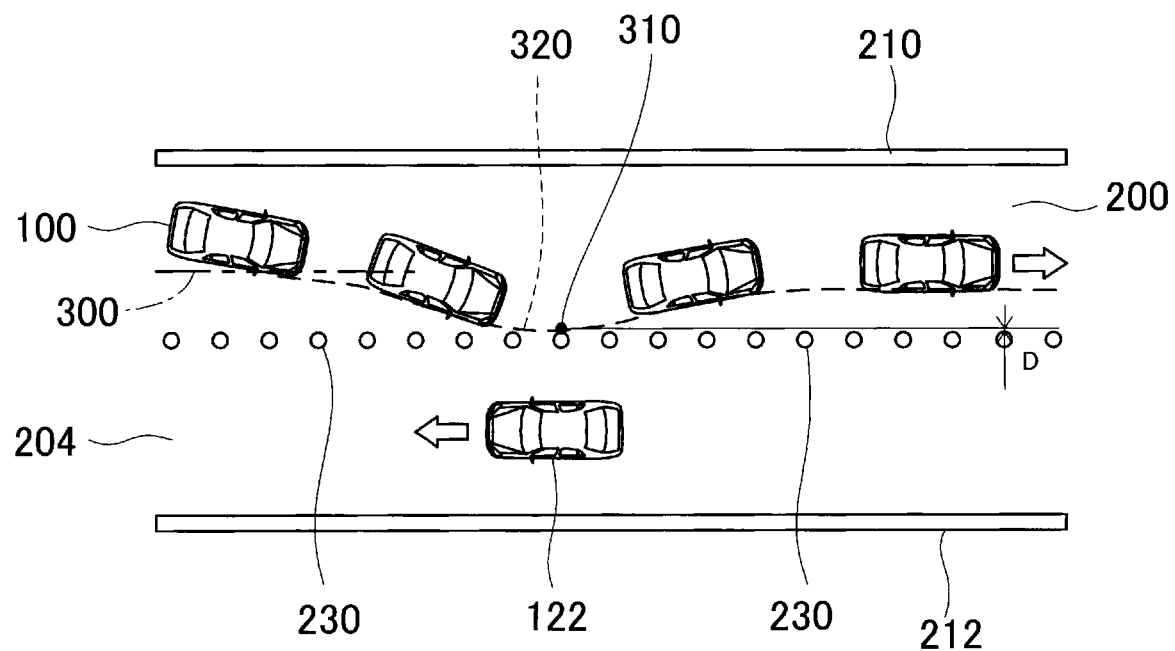
FIG. 11 is a schematic view illustrating deviation avoidance travel in a case where poles as a partition between lanes exist.

In a case where the object is not a vehicle, but, for example, as illustrated in FIG. 11, poles 230 that are arranged along the center of a two-lane road including the traveling path 200 on which the own vehicle 100 travels and an opposite lane 204 in which an oncoming vehicle 122 travels (S422: No), the boundary detection section 12 determines that the poles 230 are the part that is unsuited to travel, and that the boundary between the traveling path 200 and the poles 230 is an unsuited boundary.

The command value adjustment section 18 sets, as the command value to be output to the travel control unit 30 so as to avoid the deviation of the own vehicle 100, the target position 310 for the maximum movement position at the distance D of (boundary—L3 cm) with respect to the boundary between the traveling path 200 and the poles 230 (S426). Then, the command value adjustment section 18 advances the process to S428.

In this way, in accordance with whether or not the boundary on the deviation side of the traveling path 200 is a white line in the case where an object does not exist on the boundary or outside the boundary, and in accordance with the type of an object that exists on the boundary of the traveling path 200 or outside of the boundary, the command value adjustment section 18 adjusts and sets, as a command value to be output from the deviation avoidance section 22 to the travel control unit 30 in S428, the target position 310 for the maximum movement position on a target line 320 along which the own vehicle 100 travels during the deviation avoidance process (refer to FIG. 7 to FIG. 11). The target line 320 represents, for example, a travel trace of the edge on the deviation side in the vehicle width direction of the own vehicle 100.

In S428, based on an initial travelling condition of the own vehicle 100 at the time when the own vehicle 100 reaches the control start position 300, a travelling condition of the own vehicle 100 at the time when the own vehicle 100 reaches the target position 310 for the maximum movement position, and a travelling condition of the own vehicle 100 at the time when the deviation avoidance process is ended, the deviation avoidance section 22 sets the target line 320 along which the own vehicle 100 travels during the deviation avoidance process.

The travelling conditions of the own vehicle 100 during the deviation avoidance process include an elapsed period since the own vehicle 100 has reached the control start position 300, a lateral acceleration, a lateral velocity, and a lateral position defined by the distance from the boundary on the deviation side toward the inside of the traveling path 200. Based on those travelling conditions of the own vehicle 100 during the deviation avoidance process, the target line 320 along which the own vehicle 100 travels is determined.

In the initial travelling condition of the own vehicle 100 at the time when the own vehicle 100 reaches the control start position 300, the elapsed period is 0, the lateral acceleration and the lateral velocity are detected values from the vehicle speed sensor 62 and the acceleration sensor 56, and the lateral position is the control start position 300.

The lateral position at the time when the own vehicle 100 reaches the target position 310 for the maximum movement position corresponds to the target position 310 for the maximum movement position, which is set by the command value adjustment section 18 in any of S412, S414, S420, S424, and S426. The lateral velocity at that time is 0.

Other values of the travelling conditions at the time when the own vehicle 100 reaches the target position 310 for the maximum movement position, and at the time when the deviation avoidance process is ended, are set as appropriate based on preset reference values and in accordance with traveling environment of the own vehicle 100, such as a gradient, the curvature, a lateral inclination angle of the traveling path 200.

In S428, the deviation avoidance section 22 commands the travel control unit 30 to set the target line 320 along which the own vehicle 100 travels during the deviation avoidance process. The travel control unit 30 performs the deviation avoidance control, specifically, performs feedback control of the application of electricity to the steering motor 32 such that the own vehicle 100 travels along the target line 320 set by the command.

[1-3. Effects]

According to the first embodiment described above, the following effects can be obtained.

(1) When an object is detected on the boundary on the deviation side of the traveling path 200 or outside the boundary, the target position 310 for the maximum movement position in the case where the own vehicle 100 moves to the deviation side is set on the inside of the traveling path 200 with respect to the boundary. Thus, the own vehicle 100 can avoid deviating to the outside of the traveling path 200. Thereby, the object that exists on the boundary or outside the boundary and the own vehicle 100 can avoid coming into contact with each other.

Further, the travelling conditions of the own vehicle 100 are controlled such that the own vehicle 100 moves within the inside of the traveling path 200 with respect to the boundary. Thus, in the case where the object that exists on the boundary or outside the boundary is the pedestrian 110, a fear that the pedestrian 110 may have can be alleviated as much as possible.

(2) In the case where an object does not exist on the boundary on the deviation side of the traveling path 200 or outside the boundary and where the boundary on the deviation side is other than a white line, the target position 310 for the maximum movement position is set on the inside of the traveling path 200 with respect to the boundary. Thus, the own vehicle 100 can avoid deviating to the outside of the traveling path 200. Thereby, the own vehicle 100 can avoid traveling on the part that may be unsuited to travel of the own vehicle 100.

2. Second Embodiment

[2-1. Configuration]

The configuration of a deviation avoidance apparatus according to the second embodiment is substantially the same as the configuration of the deviation avoidance unit 10 according to the first embodiment. Thus, the same components are denoted by the same reference symbols, and descriptions thereof are omitted.

[2-2. Process]

Differences between a deviation avoidance process according to the second embodiment and the deviation avoidance process according to the first embodiment are described.

Figure 12:
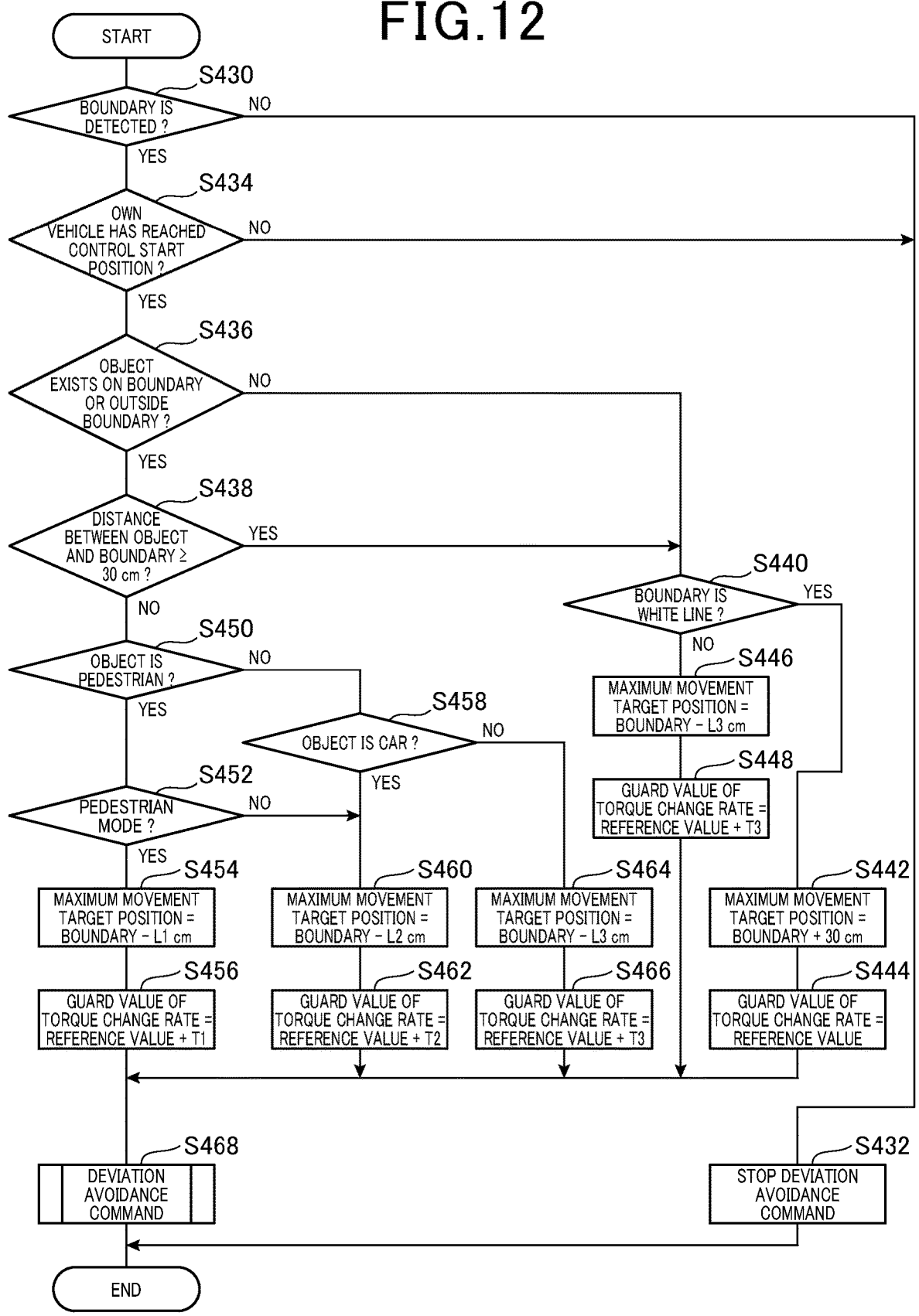
FIG. 12 is a flowchart of a deviation avoidance process according to a second embodiment.

Processes of S444, S448, S456, S462, and S466 in the flowchart of FIG. 12 are processes to be performed in addition to those in the deviation avoidance process shown in FIG. 4 according to the first embodiment. The processes other than those of S444, S448, S456, S462, and S466 are substantially the same as the processes shown in FIG. 4 according to the first embodiment, and hence detailed descriptions thereof are omitted.

In S436 of FIG. 12, in the case where an object does not exist on the boundary or outside the boundary (S436: No) or in the case where an object exists on the boundary or outside the boundary (S436: Yes) and where the distance between the object and the boundary is 30 cm or more (S438: Yes), the command value adjustment section 18 determines whether or not the detected boundary on the deviation side of the traveling path 200 is a white line (S440).

In the case where the boundary is a white line (S440: Yes), the command value adjustment section 18 sets an upper limit guard value of a change rate of driving torque as a preset reference value (S444), the driving torque being generated when the travel control unit 30 has the steering motor 32 drive the steering mechanism during the deviation avoidance process.

In the case where the boundary on the deviation side is other than the white line (S440: No), the command value adjustment section 18 sets, as a command value, the upper limit guard value of the change rate of the driving torque by adding T3 to the preset reference value (S448), the driving torque being generated when the travel control unit 30 has the steering motor 32 drive the steering mechanism during the deviation avoidance process.

Hence, the upper limit guard value of the change rate of the driving torque becomes more than the reference value. Thus, steering operation is allowed to be performed more abruptly than that in the case where the reference value is set for the upper limit guard value.

The change rate of the driving torque at the time when the steering motor 32 drives the steering mechanism is calculated, for example, as a change rate of drive current that the travel control unit 30 supplies to the steering motor 32.

In the case where the distance between the object and the boundary is less than 30 cm (S438: No), where the object is the pedestrian 110 (S450: Yes), and where the pedestrian mode has been set (S452: Yes), the command value adjustment section 18 sets, as the command value, the upper limit guard value of the change rate of the driving torque by adding T1 to the preset reference value (S456), the driving torque being generated when the travel control unit 30 has the steering motor 32 drive the steering mechanism during the deviation avoidance process. The relationship T1>T3 is established.

Thereby, the upper limit guard value of the change rate of the driving torque becomes more than that in the case where T3 is added to the reference value. Thus, steering operation is allowed to be performed more abruptly than that in the case where the value obtained by adding T3 to the reference value is set as the upper limit guard value.

In the case where the distance between the object and the boundary is less than 30 cm (S438: No), where the object is the pedestrian 110 (S450: Yes), and where the pedestrian mode has not been set (S452: No), or in the case where the object is not the pedestrian 110 (S450: No) but the vehicle 120 (S458: Yes), the command value adjustment section 18 sets, as the command value, the upper limit guard value of the change rate of the driving torque by adding T2 to the preset reference value (S462), the driving torque being generated when the travel control unit 30 has the steering motor 32 drive the steering mechanism during the deviation avoidance process.

The relationship T1>T2 is established. Thus, in the case where the pedestrian mode has not been set even when the object that exists on the boundary or outside the boundary is the pedestrian 110, or in the case where the object is the vehicle 120, steering operation is performed more slowly than that in the case where the object that exists on the boundary or outside the boundary is the pedestrian 110 and where the pedestrian mode has been set.

In the case where the distance between the object and the boundary is less than 30 cm (S438: No) and where the object is neither the pedestrian 110 (S450: No) nor the vehicle 120 (S458: No), the command value adjustment section 18 sets, as the command value, the upper limit guard value of the change rate of the driving torque by adding T3 to the preset reference value (S466), the driving torque being generated when the travel control unit 30 has the steering motor 32 drive the steering mechanism during the deviation avoidance process.

The relationship T1>T2>T3 is established. Thus, in the case where the object that exists on the boundary or outside the boundary is neither the pedestrian 110 nor the vehicle 120, steering operation is performed more slowly than that in the case where the object that exists on the boundary or outside the boundary is the vehicle 120.

In this way, in accordance with whether or not the boundary on the deviation side of the traveling path 200 is a white line in the case where an object does not exist on the boundary or outside the boundary, and in accordance with the type of an object that exists on the boundary of the traveling path 200 or outside the boundary, the command value adjustment section 18 adjusts and sets, as the command value to be output from the deviation avoidance section 22 to the travel control unit 30 in S468, the upper limit guard value of the change rate of the driving torque being generated when the steering mechanism is driven by the steering motor 32.

[2-3. Effects]

According to the second embodiment described above, the following effects can be obtained in addition to the effects of the first embodiment.

(1) In the case where an object does not exist on the boundary of the traveling path 200 or outside the boundary and where the boundary on the deviation side is other than a white line, or in accordance with the type of an object that exists on the boundary of the traveling path 200 or outside the boundary, the upper limit guard value of the change rate of the driving torque being generated when the steering mechanism is driven by the steering motor 32 is increased higher than the reference value in the case where the boundary is a white line and where an object does not exist on the boundary or outside the boundary.

Thereby, although abrupt steering operation is performed, the own vehicle 100 can travel along the target line set in the deviation avoidance process.

(2) In the case where the pedestrian 110 exists on the boundary or outside the boundary and where the pedestrian mode has been set, the upper limit guard value of the change rate of the driving torque is increased higher than that in the case where an object other than the pedestrian exists on the boundary or outside of the boundary. Thus, the own vehicle 100 can travel along the target line that is set on a more inner side with respect to the boundary compared with the case where the object is other than the pedestrian.

3. Third Embodiment

[3-1. Configuration]

The configuration of the deviation avoidance apparatus according to the third embodiment is substantially the same as the configuration of the deviation avoidance unit 10 according to the first embodiment. Thus, the same components are denoted by the same reference symbols, and descriptions thereof are omitted.

[3-2. Configuration]

Differences between the deviation avoidance process according to the third embodiment and the deviation avoidance process according to the second embodiment will be described.

Figure 13:
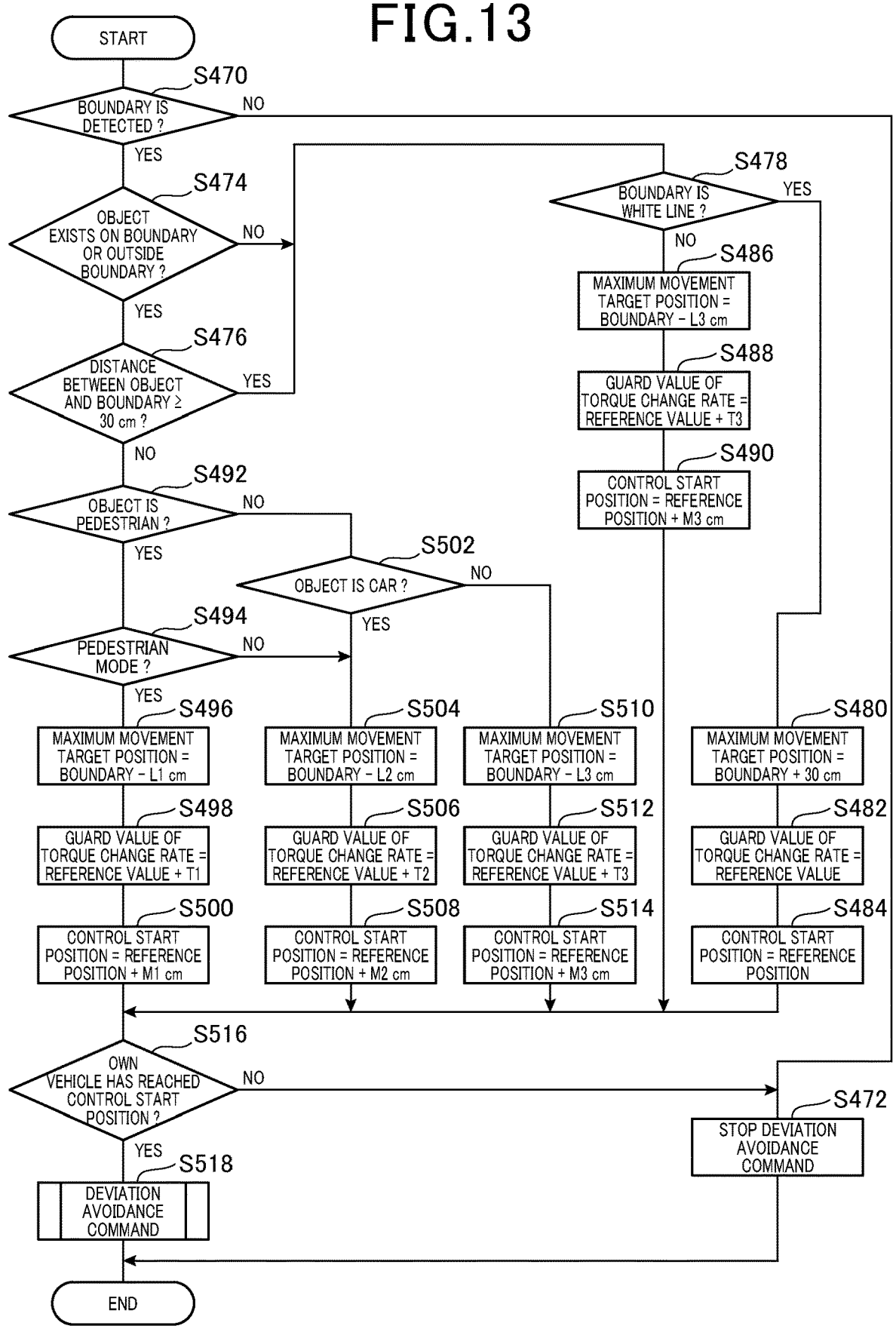
FIG. 13 is a flowchart of a deviation avoidance process according to a third embodiment.

In the flowchart of FIG. 13, the determination of S434 in FIG. 12 according to the second embodiment is shifted to S516. Further, processes of S484, S490, S500, S508, and S514 shown in FIG. 13 are processes to be performed in addition to those in the deviation avoidance process shown in FIG. 12 according to the second embodiment. The processes other than those of S484, S490, S500, S508, S514, and S516 are substantially the same as those in the deviation avoidance process shown in FIG. 12 according to the second embodiment, and hence detailed descriptions thereof are omitted.

In S474 of FIG. 13, in the case where no object exists on the boundary or outside the boundary (S474: No) or in the case where the distance between the object and the boundary is 30 cm or more (S476: Yes), the command value adjustment section 18 determines whether or not the detected boundary on the deviation side of the traveling path 200 is a white line (S478).

In the case where the boundary is a white line (S478: Yes), the command value adjustment section 18 sets a reference position for the control start position (S484), and advances the process to S516.

The reference position for the control start position is determined, as described above, from the map, for example, as the distance from the boundary on the deviation side toward the inside of the traveling path 200 by using the parameters such as the lateral velocity of the own vehicle 100, the curvature of the traveling path 200, and the width of the traveling path 200.

In the case where the boundary is other than a white line (S478: No), the command value adjustment section 18 sets, as the command value, the control start position 300 by adding M3 to the reference position (S490), and advances the process to S516.

Thereby, the position at which the deviation avoidance process is started is spaced apart from the deviation side with respect to the reference position. Thus, the own vehicle 100 can travel along the set target line by steering operation slower than that in a case where the deviation avoidance process is started at the reference position.

In the case where the distance between the object and the boundary is less than 30 cm (S476: No), where the object is the pedestrian 110 (S492: Yes), and where the pedestrian mode has been set (S494: Yes), the command value adjustment section 18 sets, as the command value, the control start position 300 by adding M1 to the reference position (S500), and advances the process to S516. The relationship M1>M3 is established.

Thereby, the position at which the deviation avoidance process is started is spaced further apart from the deviation side than that in the case where M3 is added to the reference position. Thus, the own vehicle 100 can travel along the set target line by steering operation slower than that in a case where the deviation avoidance process is started at the position in the case where M3 is added to the reference position.

In the case where the distance between the object and the boundary is less than 30 cm (S476: No), where the object is the pedestrian 110 (S492: Yes), and where the pedestrian mode has not been set (S494: No), or in the case where the object is not the pedestrian 110 (S492: No) but the vehicle 120 (S502: Yes), the command value adjustment section 18 sets, as the command value, the control start position 300 by adding M2 to the reference position (S508), and advances the process to S516. The relationship M1. M2>M3 is established.

In the case where the distance between the object and the boundary is less than 30 cm (S476: No) and where the object is neither the pedestrian 110 (S492: No) nor the vehicle 120 (S502: No), the command value adjustment section 18 sets, as the command value, the control start position 300 by adding M3 to the reference position (S514), and advances the process to S516.

In this way, in accordance with whether or not the boundary on the deviation side of the traveling path 200 is a white line in the case where an object does not exist on the boundary or outside the boundary, and in accordance with the type of an object that exists on the boundary of the traveling path 200 or outside the boundary, the command value adjustment section 18 adjusts and sets, as the command value to be output from the deviation avoidance section 22 to the travel control unit 30 in S518, the control start position 300 at which the travel control unit 30 is had perform the deviation avoidance control.

In S516, the deviation avoidance section 22 determines whether or not the own vehicle 100 has reached the control start position 300 that has been set in any of S484, S490, S500, S508, and S514. In the case where the own vehicle 100 has not yet reached the control start position 300 (S516: No), the deviation avoidance section 22 has the travel control unit 30 stop the deviation avoidance control (S472).

In the case where the own vehicle 100 has already reached the control start position 300 (S516: Yes), the deviation avoidance section 22 has the travel control unit 30 perform the deviation avoidance control (S518).

[3-3. Effects]

According to the third embodiment described above, the following effects can be obtained in addition to the effects of the second embodiment.

(1) In the case where an object does not exist on the boundary of the traveling path 200 or outside of the boundary and where the boundary on the deviation side is other than a white line or in accordance with the type of an object that exists on the boundary of the traveling path 200 or outside the boundary, the travel control unit 30 is had start the deviation avoidance control at the position spaced apart from the deviation side with respect to the reference position in the case where the boundary is a white line and where an object does not exist outside the boundary. Thus, the own vehicle 100 can travel along the target line by steering operation slower than that in the case where the deviation avoidance control is started at the reference position.

(2) In the case where the object on the boundary of the traveling path 200 or outside the boundary is the pedestrian 110, the control start position 300 is set as the position farther from the deviation side than those in the cases where the object is other than the pedestrian. Thus, in the case where the object is the pedestrian 110, even when the target position 310 for the maximum movement position is set on the more inner side than that in the cases where the object is other than the pedestrian, the own vehicle 100 can travel along the target line while avoiding abrupt steering operation.

4. Fourth Embodiment

[4-1. Configuration]

Figure 14:
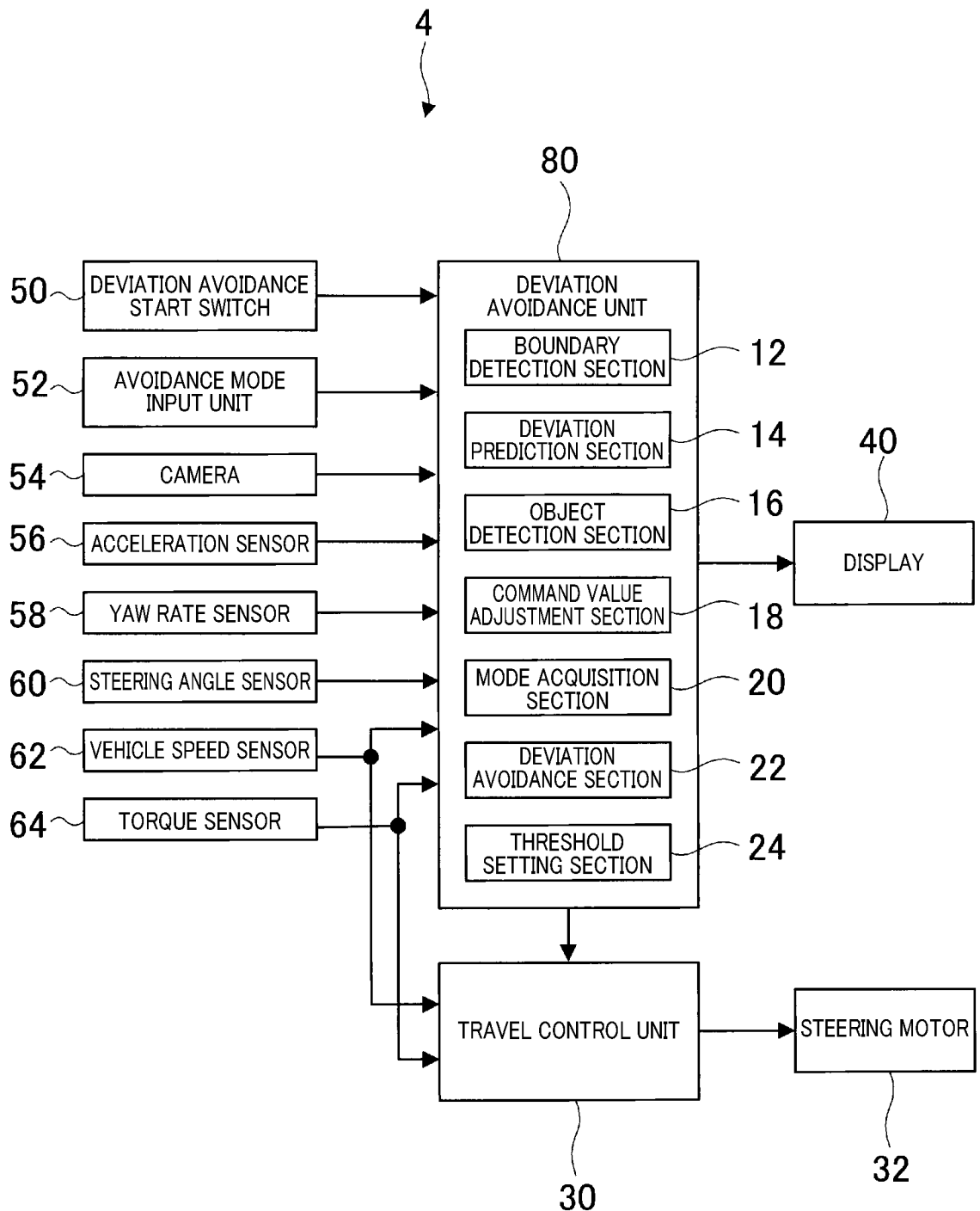
FIG. 14 is a block diagram showing a deviation avoidance apparatus according to a fourth embodiment.

The configuration of a deviation avoidance unit 80 of a deviation avoidance system 6 according to the fourth embodiment shown in FIG. 14 is different from that of the deviation avoidance unit 10 according to the first embodiment in including a threshold setting section 24. Other configuration details of the deviation avoidance unit 80 are substantially the same as those of the deviation avoidance unit 10 according to the first embodiment. Thus, the same components are denoted by the same reference symbols, and descriptions thereof are omitted.

When the steering torque generated by the driver, which is acquired from the torque sensor 64, is equal to or more than a threshold at which the deviation avoidance section 22 has the travel control unit 30 stop the deviation avoidance control, the threshold setting section 24 sets, in accordance with the type of an object that is detected on the boundary of the traveling path 200 or outside the boundary, the threshold less than that in the case where an object is not detected on the boundary of the traveling path 200 or outside the boundary.

[4-2. Process]

The deviation avoidance process according to the fourth embodiment is performed in addition to any of the deviation avoidance processes according to the first embodiment to the third embodiment.

Figure 15:
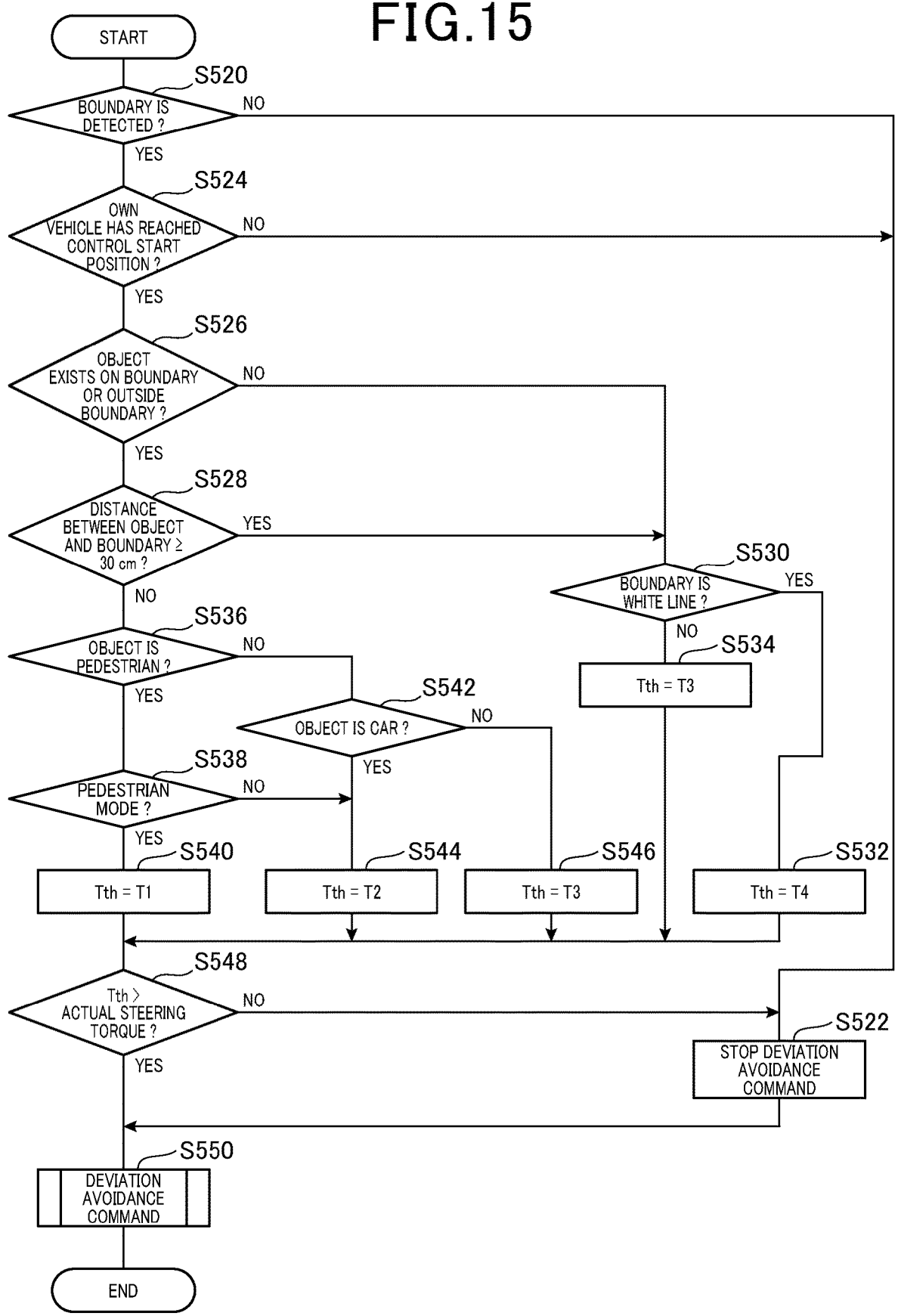
FIG. 15 is a flowchart of a deviation avoidance process according to the fourth embodiment.

S532, S534, S540, S544, and S546 in FIG. 15 are performed instead of S412, S414, S420, S424, and S426 in FIG. 4. Determination of S548 is performed before the process of S550.

In the case where an object does not exist on the boundary or outside of the boundary (S526: No), or in the case where the distance between the object and the boundary is 30 cm or more (S528: Yes), the threshold setting section 24 determines whether or not the detected boundary on the deviation side of the traveling path 200 is a white line (S530).

In the case where the boundary is a white line (S530: Yes), the threshold setting section 24 sets a steering torque threshold (Tth) for determining whether or not the steering torque generated when the driver operates the wheel 70 is less than the threshold to T4 (S532), and advances the process to S548.

In the case where the boundary is other than a white line (S530: No), the threshold setting section 24 sets the steering torque threshold (Tth) to T3 (S534), and advances the process to S548. T3<T4 is established.

In the case where the distance between the object and the boundary is less than 30 cm (S528: No), where the object is the pedestrian 110 (S536: Yes), and where the pedestrian mode has been set (S538: Yes), the threshold setting section 24 sets the steering torque threshold (Tth) to T1 (S540), and advances the process to S548. T1<T3<T4 is established.

In the case where the distance between the object and the boundary is less than 30 cm (S528: No), where the object is the pedestrian 110 (S536: Yes), and where the pedestrian mode has not been set (S538: No), or in the case where the object is not the pedestrian 110 (S536: No) but the vehicle 120 (S542: Yes), the threshold setting section 24 sets the steering torque threshold (Tth) to T2 (S544), and advances the process to S548. T1<T2<T3<T4 is established.

In the case where the distance between the object and the boundary is less than 30 cm (S528: No) and where the object is neither the pedestrian 110 (S536: No) nor the vehicle 120 (S542: No), the threshold setting section 24 sets the steering torque threshold (Tth) to T3 (S546), and advances the process to S548.

In this way, in accordance with whether or not the boundary on the deviation side of the traveling path 200 is a white line in the case where an object does not exist on the boundary or outside the boundary, and in accordance with the type of an object that exists on the boundary of the traveling path 200 or outside the boundary, the threshold setting section 24 sets the steering torque threshold (Tth) at the time of determining whether or not the deviation avoidance section 22 has the travel control unit 30 stop the deviation avoidance control.

In S548, the deviation avoidance section 22 determines whether or not an actual steering torque that is detected by the torque sensor 64 is less than the steering torque threshold (Tth) that has been set in any of S532, S534, S540, S544, and S546. In a case where the actual steering torque is less than the steering torque threshold (Tth) (S548: Yes), the deviation avoidance section 22 has the travel control unit 30 perform the deviation avoidance control (S550).

In a case where the actual steering torque is equal to or more than the steering torque threshold (Tth) (S548: No), the deviation avoidance section 22 respects an intention of the driver who tries to avoid deviation by operating the wheel 70, and has the travel control unit 30 stop the deviation avoidance control (S522).

[4-3. Effects]

According to the fourth embodiment, the following effects can be obtained in addition to the effects of any one of the first embodiment to the third embodiment.

In the case where the steering torque generated by the driver is equal to or more than the set steering torque threshold, that is, where the driver indicates an intention to perform deviation avoidance, the intention of the driver is respected, and the deviation avoidance control can be immediately stopped.

5. Fifth Embodiment

[5-1. Configuration]

Figure 16:
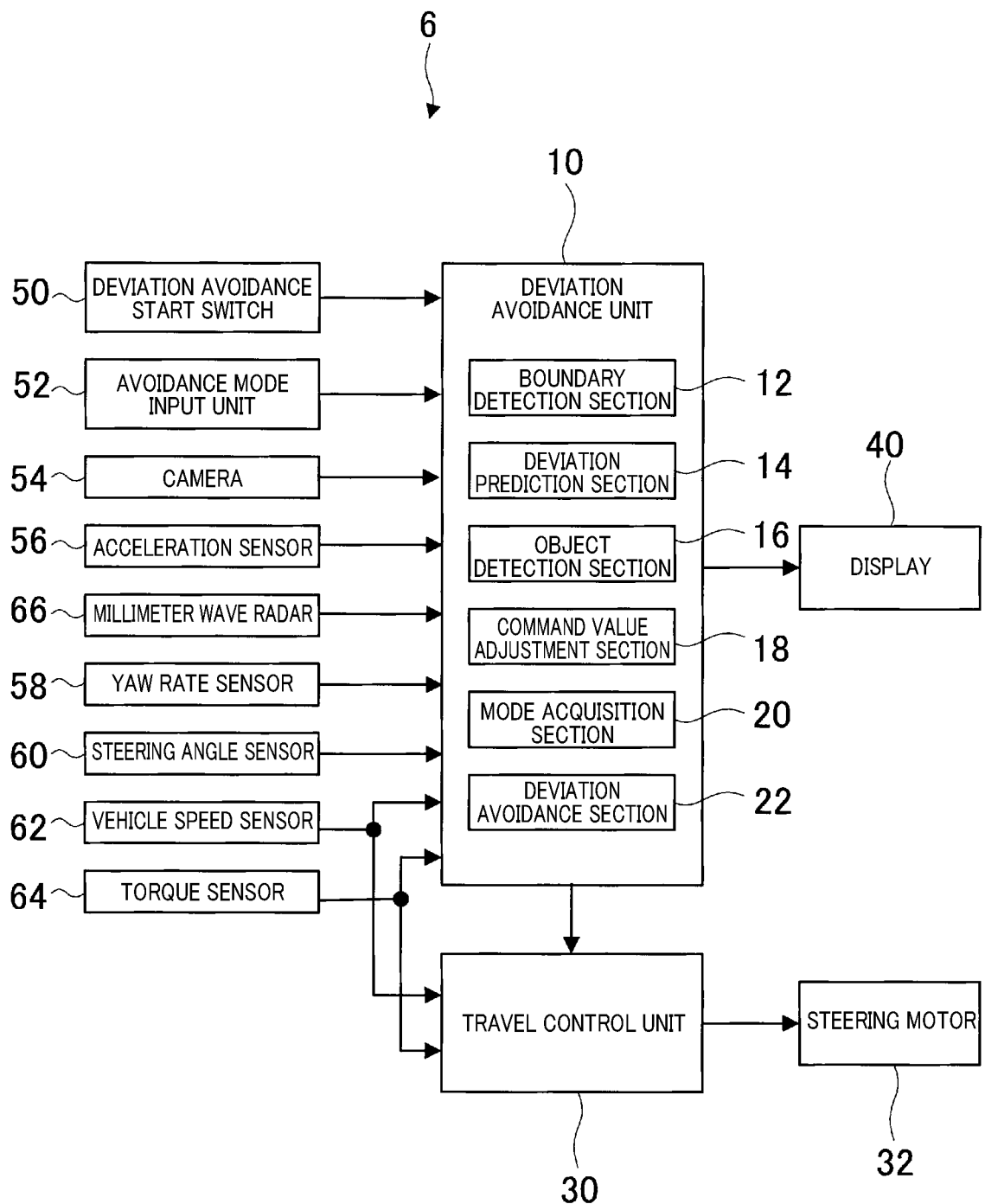
FIG. 16 is a block diagram showing a deviation avoidance apparatus according to a fifth embodiment.

The deviation avoidance system 6 according to the fifth embodiment shown in FIG. 16 is different from the deviation avoidance system 2 according to the first embodiment in detecting objects not only by the camera 54 but also by a millimeter wave radar 66. Other configuration details of the deviation avoidance system 6 according to the fifth embodiment are substantially the same as those of the deviation avoidance system 2 according to the first embodiment.

[5-2. Effects]

Objects are detected not only by the camera 54 but also by the millimeter wave radar 66, and hence accuracy in detecting the distance to an object can be increased. Thereby, latitude in generating the target line 320 along which the own vehicle 100 travels in the deviation avoidance process can be increased.

6. Other Embodiments (1) As long as the object that exists on the boundary with respect to the traveling path 200 or outside of the boundary is an object having a risk of contact with the own vehicle 100, the object is not limited to the pedestrian 110, the vehicle 120, and the poles 230 exemplified in the above described embodiments, and may be a wall, a building, a guardrail, or the like, (2) The control for having the own vehicle 100 avoid deviating to the outside of the traveling path 200 is not limited to the steering operation including the control of the steering motor 32, and may be steering operation in which brake control for changing the travelling direction of the own vehicle 100 by braking only right wheels or left wheels is performed. Alternatively, the control may be steering operation in which both the control of the steering motor 32 and the brake control are performed.

(3) In the above embodiments, in the case where an object that exists on the boundary of the traveling path 200 or outside the boundary is the pedestrian 110, the pedestrian mode is set such that the command value to be output to the travel control unit 30 that performs the deviation avoidance control is set as a command value that is different from those with respect to objects other than the pedestrian.

However, the pedestrian mode need not necessarily be set, and the deviation avoidance units 10 and 80 may set the command values to be output to the travel control unit 30 in accordance with the type of an object that is detected by the object detection section 16. Alternatively, the deviation avoidance units 10 and 80 may set the same command value irrespective of the type of the object that exists on the boundary of the traveling path 200 or outside the boundary.

(4) In order that the own vehicle 100 avoids deviating from the traveling path 200, the deviation avoidance units 10 and 80 only need to adjust at least any one of the target position 310 for the maximum movement position, the upper limit guard value of the change rate of the driving torque being generated when the steering motor 32 drives the steering mechanism, and the control start position 300.

(5) The function of one component in the above-described embodiments may be distributed to a plurality of components, or the functions of the plurality of components may be integrated into that of one component. Further, at least some of the configurations of the above-described embodiments may be replaced with known configurations having similar functions. In addition, some of the configurations of the above-described embodiments may be omitted as long as problems can be solved. Note that, the embodiments of the present invention correspond to various aspects encompassed within the technical idea specified only by the wording of the claims.

(6) The present invention can be realized not only as the above-described deviation avoidance units 10 and 80, but also in various forms such as the deviation avoidance systems 2, 4, and 6 including the deviation avoidance units 10 and 80 as components, a deviation avoidance program for allowing a computer to function as the deviation avoidance units 10 and 80, a recording medium storing the deviation avoidance program, and a deviation avoidance method.

The deviation avoidance units (10, 80) according to the embodiments each include the boundary detection section (12, S400, S430, S470, S520), the deviation prediction section (14, S404, S434, S516, S524), the object detection section (16, S406, S416, S422, S436, S450, S458, S474, S492, S502, S526, S536, S542), the deviation avoidance section (22, S428, S468, S518, S550), and the command value adjustment section (18, S420, S424, S426, S454, S456, S460 to S466, S496 to S500, S504 to S514).

The boundary detection section detects the boundaries (210*a*, 214*a*, 222) defining both the edges in the width direction of the traveling path (200) on which the own vehicle (100) travels. Based on a travelling condition of the own vehicle that travels on the traveling path defined by the boundaries detected by the boundary detection section, the deviation prediction section predicts that the own vehicle will deviate from the traveling path. The object detection section detects an object (110, 120, 130) that exists on the boundary on the side where the own vehicle deviates from the traveling path, or outside the boundary.

When the deviation prediction section predicts that the own vehicle will deviate from the traveling path, the deviation avoidance unit commands the travel control unit (30) that controls the travelling condition to have the own vehicle avoid deviating from the traveling path. When the object detection section detects an object, the command value adjustment section adjusts the command value to be output from the deviation avoidance unit to the travel control unit such that the maximum movement position in the case where the own vehicle moves to the deviation side is on the inside of the traveling path with respect to the boundary on the deviation side or on the boundary.

According to the configuration, in the case where the object exists on the boundary of the traveling path or outside the boundary, the travelling condition of the own vehicle is controlled such that the own vehicle moves within the inside of the traveling path with respect to the boundary. Thus, the own vehicle can be restrained from deviating to the outside of the traveling path. Thereby, the object that exists on the boundary or outside of the boundary and the own vehicle can avoid coming into contact with each other.

Further, the travelling condition of the own vehicle is controlled such that the own vehicle moves within the inside of the traveling path with respect to the boundary. Thus, in the case where the object that exists on the boundary or outside the boundary is a pedestrian, a fear that the pedestrian may have can be alleviated as much as possible.

Note that, the parenthesized reference symbols described in the claims represent correspondences to the specific means described in the embodiments that are described below as an example, and do not limit the technical scope of the present invention.

REFERENCE SIGNS LIST 2, 4, 6: Deviation avoidance system
10, 80: Deviation avoidance unit
12: Boundary detection section
14: Deviation prediction section
16: Object detection section
18: Command value adjustment section
20: Mode acquisition section
22: Deviation avoidance section
24: Threshold setting section
52: Avoidance mode input unit (input unit)
54: Camera
66: Millimeter wave radar
100: Own vehicle
110: Pedestrian (object)
120: Vehicle (object)
200: Traveling path
210a: Inner edge (boundary)
220: Unsuited part
222: Suitability boundary (boundary)
230: Pole (object, unsuited part)
300: Control start position
310: Target position

The invention claimed is:

1. A deviation avoidance apparatus comprising:
a boundary detection section that detects boundaries of a traveling path defining both edges in a width direction of the traveling path on which an own vehicle travels;
a deviation prediction section that predicts that the own vehicle will deviate from the traveling path based on a travelling condition of the own vehicle that travels on the traveling path defined by the boundaries detected by the boundary detection section;
an object detection section that detects an object that exists on or outside of one of the boundaries, the one of the boundaries being on a side of the traveling path towards which the own vehicle moves towards when deviating from the traveling path;
a deviation avoidance section that outputs a command value to a travel control unit which commands, in response to the deviation prediction section predicting that the own vehicle will deviate from the traveling path, the travel control unit to drive a steering actuator to steer the own vehicle to avoid deviating from the traveling path, the travel control unit controlling the travelling condition; and
a command value adjustment section that sets an upper limit guard value of the command value to be larger for a case in which the object is a pedestrian than for a case in which the object is not a pedestrian,
wherein the upper limit guard value corresponds to a change rate of a driving torque for driving the steering actuator which adjusts a maximum movement position of the own vehicle from the one of the boundaries.

2. The deviation avoidance apparatus according to claim 1, wherein the command value adjustment section adjusts, as the command value, a timing at which the deviation avoidance section has the travel control unit start deviation avoidance control for having the own vehicle avoid deviating from the traveling path, in accordance with a type of the object.

3. The deviation avoidance apparatus according to claim 2, wherein
when the command value adjustment section adjusts the timing in accordance with the type of the object, for a state in which the object is a pedestrian, the command value adjustment section sets a control start position, at which the deviation avoidance section has the travel control unit start the deviation avoidance control, to a position spaced apart from the side where the own vehicle deviates from the traveling path compared with a case where the object is other than a pedestrian.

4. The deviation avoidance apparatus according to claim 1, wherein the command value adjustment section sets, as the command value, a target position for the maximum movement position on the inside of the traveling path with respect to the one of the boundaries on the side where the own vehicle deviates from the traveling path.

5. The deviation avoidance apparatus according to claim 1, further comprising a threshold setting section that sets a threshold, at which the deviation avoidance section has the travel control unit stop deviation avoidance control for having the own vehicle avoid deviating from the traveling path, less than that in a case where the object detection section does not detect the object, for a state in which a steering torque generated when a driver operates a steering wheel is equal to or more than the threshold.

6. The deviation avoidance apparatus according to claim 1, wherein, in a case where the object detected by the object detection section is a pedestrian, the command value adjustment section adjusts the command value such that the maximum movement position is set on a more inner side with respect to the one of the boundaries than in the case where the object is other than a pedestrian.

7. The deviation avoidance apparatus according to claim 1, wherein the object detection section detects the object based on image data acquired by an on-vehicle camera.

8. The deviation avoidance apparatus according to claim 7, wherein the object detection section detects the object also with an on-vehicle millimeter wave radar.

9. The deviation avoidance apparatus according to claim 1, further comprising a mode acquisition section that acquires, in a case where the object detected by the object detection section is a pedestrian, a pedestrian mode for adjusting the command value in accordance with the pedestrian via an input unit that allows input of the pedestrian mode.

10. The deviation avoidance apparatus according to claim 1, wherein
in a case where a white line does not exist on at least one of edge portion sides on both sides in the width direction of the traveling path and where a part that is structurally unsuited to travel of the own vehicle exists on the at least one of the edge portion sides, the boundary detection section detects a boundary between the part that is structurally unsuited to the travel and the traveling path as a suitability boundary that is defined based on suitability to the travel, and,
in a case where the deviation prediction section predicts that the own vehicle will deviate to an outside of the suitability boundary and where the object detection section does not detect an object that exists on the suitability boundary or outside the suitability boundary, the command value adjustment section adjusts the command value such that a maximum movement position in a case where the own vehicle moves toward the suitability boundary on the side where the own vehicle deviates from the traveling path is set on the inside of the traveling path with respect to the suitability boundary.

11. A deviation avoidance apparatus comprising:
a boundary detection section that detects boundaries of a traveling path defining both edges in a width direction of the traveling path on which an own vehicle travels;
a deviation prediction section that predicts that the own vehicle will deviate from the traveling path based on a travelling condition of the own vehicle that travels on the traveling path defined by the boundaries detected by the boundary detection section;
an object detection section that detects an object that exists on or outside of one of the boundaries, the one of the boundaries being on a side of the traveling path towards which the own vehicle moves towards when deviating from the traveling path;
a deviation avoidance section that outputs a command value to a travel control unit which commands, in response to the deviation prediction section predicting that the own vehicle will deviate from the traveling path, the travel control unit to drive a steering actuator to steer the own vehicle to avoid deviating from the traveling path, the travel control unit controlling the travelling condition; and
a command value adjustment section that adjusts a timing at which the deviation avoidance section outputs the command value to the travel control unit, in response to the object detection section detecting the object, which commands the travel control unit to start deviation avoidance control to drive the steering actuator to steer the own vehicle to avoid deviating from the traveling path,
wherein adjusting the timing adjusts a maximum movement position of the own vehicle from the one of the boundaries.

12. The deviation avoidance apparatus according to claim 11, wherein the command value adjustment section sets, as the command value, a target position for the maximum movement position on the inside of the traveling path with respect to the one of the boundaries on the side where the own vehicle deviates from the traveling path.

13. The deviation avoidance apparatus according to claim 11, further comprising a threshold setting section that sets a threshold, at which the deviation avoidance section has the travel control unit stop deviation avoidance control for having the own vehicle avoid deviating from the traveling path, less than that in a case where the object detection section does not detect the object, for a state in which a steering torque generated when a driver operates a steering wheel is equal to or more than the threshold.

14. The deviation avoidance apparatus according to claim 11, wherein, in a case where the object detected by the object detection section is a pedestrian, the command value adjustment section adjusts the command value such that the maximum movement position is set on a more inner side with respect to the one of the boundaries than in a case where the object is other than a pedestrian.

15. The deviation avoidance apparatus according to claim 11, wherein the object detection section detects the object based on image data acquired by an on-vehicle camera.

16. The deviation avoidance apparatus according to claim 15, wherein the object detection section detects the object also with an on-vehicle millimeter wave radar.

17. The deviation avoidance apparatus according to claim 11, further comprising a mode acquisition section that acquires, in a case where the object detected by the object detection section is a pedestrian, a pedestrian mode for adjusting the command value in accordance with the pedestrian via an input unit that allows input of the pedestrian mode.

18. The deviation avoidance apparatus according to claim 11, wherein
in a case where a white line does not exist on at least one of edge portion sides on both sides in the width direction of the traveling path and where a part that is structurally unsuited to travel of the own vehicle exists on the at least one of the edge portion sides, the boundary detection section detects a boundary between the part that is structurally unsuited to the travel and the traveling path as a suitability boundary that is defined based on suitability to the travel, and,
in a case where the deviation prediction section predicts that the own vehicle will deviate to an outside of the suitability boundary and where the object detection section does not detect an object that exists on the suitability boundary or outside the suitability boundary, the command value adjustment section adjusts the command value such that a maximum movement position in a case where the own vehicle moves toward the suitability boundary on the side where the own vehicle deviates from the traveling path is set on the inside of the traveling path with respect to the suitability boundary.

* * * * *